(12) United States Patent
Kaufmann et al.

(10) Patent No.: US 8,676,545 B2
(45) Date of Patent: Mar. 18, 2014

(54) METHODS AND APPARATUS TO DETERMINE AIR DUCT SYSTEM CONFIGURATIONS

(75) Inventors: Nicholas L. Kaufmann, Sherill, IA (US); Brenda L. Ritt, Dubuque, IA (US); Cary Pinkalla, Fox Point, WI (US); Kevin J. Gebke, Dubuque, IA (US); Frank Heim, Platteville, WI (US); William A. Niehaus, Holy Cross, IA (US); Matthew Lux, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 803 days.

(21) Appl. No.: 12/831,864

(22) Filed: Jul. 7, 2010

(65) Prior Publication Data
US 2012/0010752 A1    Jan. 12, 2012

(51) Int. Cl.
*G06F 17/50*    (2006.01)

(52) U.S. Cl.
USPC ........ 703/1; 700/1; 700/9; 700/277; 454/232; 454/284; 454/236; 454/155; 236/49.1; 236/49.3; 236/49.4

(58) Field of Classification Search
None
See application file for complete search history.

(56) References Cited

U.S. PATENT DOCUMENTS

| 2,597,609 | A | | 5/1952 | Bartlett et al. | |
|---|---|---|---|---|---|
| 3,699,872 | A | * | 10/1972 | Kruger | 454/303 |
| 3,876,138 | A | * | 4/1975 | Dean, Jr. | 236/49.4 |
| 4,551,810 | A | * | 11/1985 | Levine | 700/182 |
| 5,439,402 | A | * | 8/1995 | Dai et al. | 440/47 |
| 6,280,320 | B1 | * | 8/2001 | Paschke et al. | 454/298 |
| 6,340,328 | B1 | * | 1/2002 | Schwandt et al. | 454/155 |
| 6,866,203 | B2 | | 3/2005 | Messmer et al. | |
| 7,689,386 | B1 | | 3/2010 | Gates | |
| 8,374,725 | B1 | * | 2/2013 | Ols | 700/277 |

(Continued)

FOREIGN PATENT DOCUMENTS

| CA | 521602 | 2/1956 |
|---|---|---|
| EP | 1 059 492 | 12/2000 |

(Continued)

OTHER PUBLICATIONS

Patent Cooperation Treaty, "International Search Report," issued by the International Searching Authority in connection with PCT application No. PCT/US2011/043067, mailed Nov. 9, 2011 (4 pages).

(Continued)

*Primary Examiner* — Thai Phan
*Assistant Examiner* — Cuong Luu
(74) *Attorney, Agent, or Firm* — Hanley, Flight and Zimmerman, LLC

(57) ABSTRACT

Example methods, apparatus, and articles of manufacture to determine pliable air duct configurations are disclosed. A disclosed example method involves determining a first quantity of adjustable air outlet duct sections to configure an air delivery duct system when an operating mode identifier is received. The operating mode identifier is associated with an amount of air delivered by the air delivery duct system into targeted areas. The first quantity of adjustable air outlet duct sections is based on an airflow rate value and the operating mode identifier. The airflow rate value is indicative of airflow through an air delivery duct system. Each adjustable air outlet duct section includes at least one adjustable air outlet having at least one size-adjustable orifice.

14 Claims, 17 Drawing Sheets

(56) References Cited

U.S. PATENT DOCUMENTS

| | | | | |
|---|---|---|---|---|
| 2001/0054493 | A1* | 12/2001 | Hatanaka | 165/53 |
| 2002/0107671 | A1* | 8/2002 | Ballus | 703/1 |
| 2006/0252365 | A1* | 11/2006 | Gebke | 454/306 |
| 2008/0113610 | A1* | 5/2008 | Brown et al. | 454/339 |
| 2008/0176506 | A1* | 7/2008 | Gebke et al. | 454/284 |
| 2011/0269390 | A1 | 11/2011 | Pinkalla et al. | |

FOREIGN PATENT DOCUMENTS

| | | |
|---|---|---|
| JP | 7004731 | 1/1995 |
| JP | 2006195520 | 7/2006 |
| JP | 2007147102 | 6/2007 |

OTHER PUBLICATIONS

Patent Cooperation Treaty, "Written Opinion of the International Searching Authority," issued by the International Searching Authority in connection with PCT/US2011/043067, mailed Nov. 9, 2011 (5 pages).

Professional Equipment, "Ductulator—HVAC Duct Sizing Calculator, 1998," Printable Product Detail—HV403-0193, retrieved from http://www.professionalequipment.com/printable_view_product.asp?productid=1906 on Apr. 26, 2012, 1 page International Training Institute, "Air Duct Calculator," 1998, retrieved from http://www.sheetmetal-iti.org/, 1 page.

* cited by examiner

FIG. 3 — 300

| DIA | 12" | 16" | 20" | 24" | 28" |
|---|---|---|---|---|---|
| CFM | 1-1000 | 1001-2000 | 2001-3000 | 3001-4000 | 4001-5000 |

ALLOWABLE AIRFLOW RANGE PER DIAMETER 302, 304

FIG. 4 — 400

AIRFLOW OUTPUT PER ADJUSTABLE AIR OUTLET (AAO) SECTION

|  | 12" | 16" | 20" | 24" | 28" |
|---|---|---|---|---|---|
| LOW | 140 (CFM) | 200 | 320 | 380 | 460 |
| MEDIUM | 200 | 280 | 460 | 560 | 680 |
| HIGH | 260 | 380 | 620 | 760 | 920 |

AAO CONFIGURATION PRE-SET: LOW

|  | RIGHT | LEFT |
|---|---|---|
| FRONT | $S_{AIRFLOW}$ | $S_{AIRFLOW}$ |
| BACK | $S_{AIRFLOW}$ | $S_{AIRFLOW}$ |
| TOTAL | (SUM) | |

| ORIFICE SIZE | AIRFLOW OUTPUT |
|---|---|
| CLOSED | 0 |
| SMALL | $S_{AIRFLOW}$ |
| MED | $M_{AIRFLOW}$ |
| LARGE | $L_{AIRFLOW}$ |

AAO CONFIGURATION CUSTOMIZABLE SETTING

|  | RIGHT | LEFT |
|---|---|---|
| FRONT | 0 ▷ | 0 ▷ |
| BACK | 0 ▷ | 0 ▷ |
| TOTAL | 0 | |

| ORIFICE SIZE | AIRFLOW OUTPUT |
|---|---|
| CLOSED | 0 |
| SMALL | $S_{AIRFLOW}$ |
| MED | $M_{AIRFLOW}$ |
| LARGE | $L_{AIRFLOW}$ |

602, 604, 606

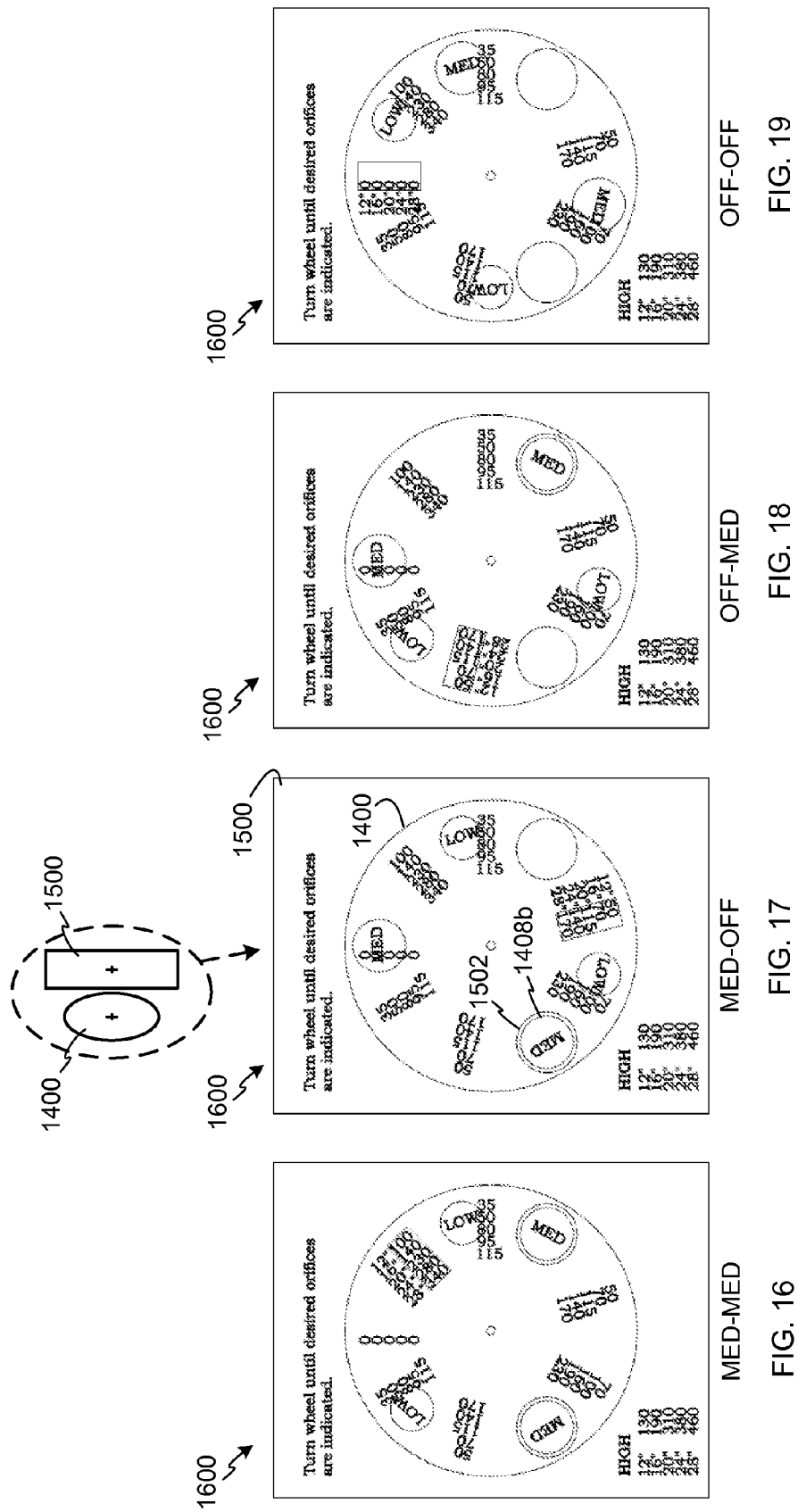

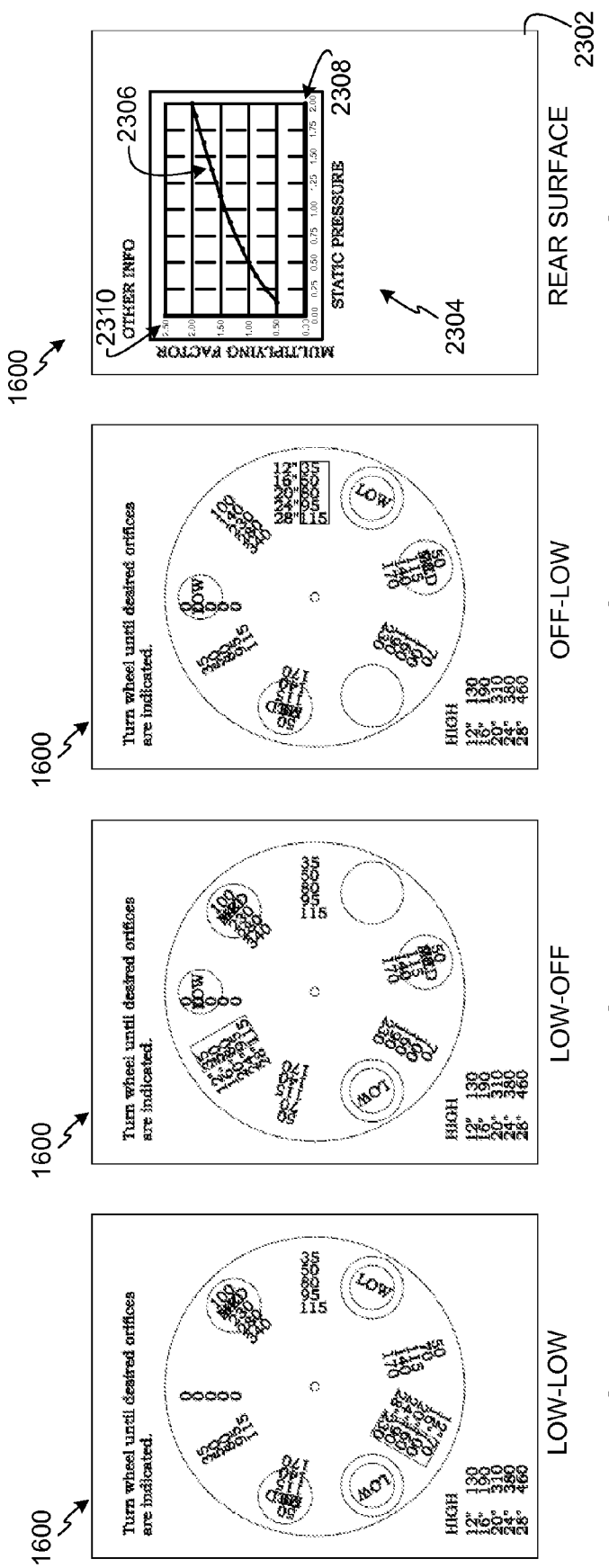

REAR SURFACE

METHODS AND APPARATUS TO DETERMINE AIR DUCT SYSTEM CONFIGURATIONS

FIELD OF THE DISCLOSURE

This disclosure relates generally to air duct systems and more specifically to methods and apparatus to determine air duct system configurations.

BACKGROUND

Sheet metal ductwork is often used for conveying conditioned air to a comfort zone, such as a room or other areas of a building. Metal ducts, however, can be expensive, unsightly, and susceptible to condensation. Consequently, inflatable air ducts, such as those made of pliable fabric, are often preferred over conventional sheet metal ones.

Inflatable air ducts typically comprise an inflatable tube made of fabric or otherwise pliable material and are also used for conveying conditioned air to comfort zones. A blower at the inlet of the duct is selectively activated to supply conditioned air as needed. The air discharged from the blower inflates the duct to create a radially expanded tubular conduit that conveys the air along the length of the inflated tube. The pliable wall of the tube can be porous and/or be perforated along its length for evenly or strategically dispersing air from within the duct into the areas being conditioned or ventilated.

Inflatable air ducts are often suspended from a horizontal cable or track mounted just below the ceiling of a building. In other cases, inflatable ducts are installed beneath a floor and supply conditioned air to a comfort zone by releasing the air up through one or more openings in the floor.

BRIEF DESCRIPTION OF THE DRAWINGS

FIG. 3 is an example airflow range data structure indicative of allowable airflow rates through different air duct diameter sizes.

FIG. 4 is an example AAO section airflow data structure indicative of airflow outputs per AAO section for different airflow output operating modes.

FIG. 5 is an example pre-defined AAO configuration user interface that may be used in connection with the example duct design user interface of FIG. 1 to select adjustable airflow output orifice sizes of active duct sections for delivering air into targeted areas.

FIG. 6 is an example customizable AAO configuration user interface that may be used in connection with the example duct design user interface of FIG. 1 to select adjustable airflow output orifice sizes of active duct sections for delivering air into targeted areas.

FIGS. 16-22 depict different positions of the rotatable disc of FIG. 14 relative to the backing of FIG. 15 specifying different sizes of adjustable air outlets for active duct sections.

FIG. 23 depicts a back side of the backing of FIG. 15 including static pressure information to facilitate configuring adjustable air outlets for active duct sections.

DETAILED DESCRIPTION

Figure 1:
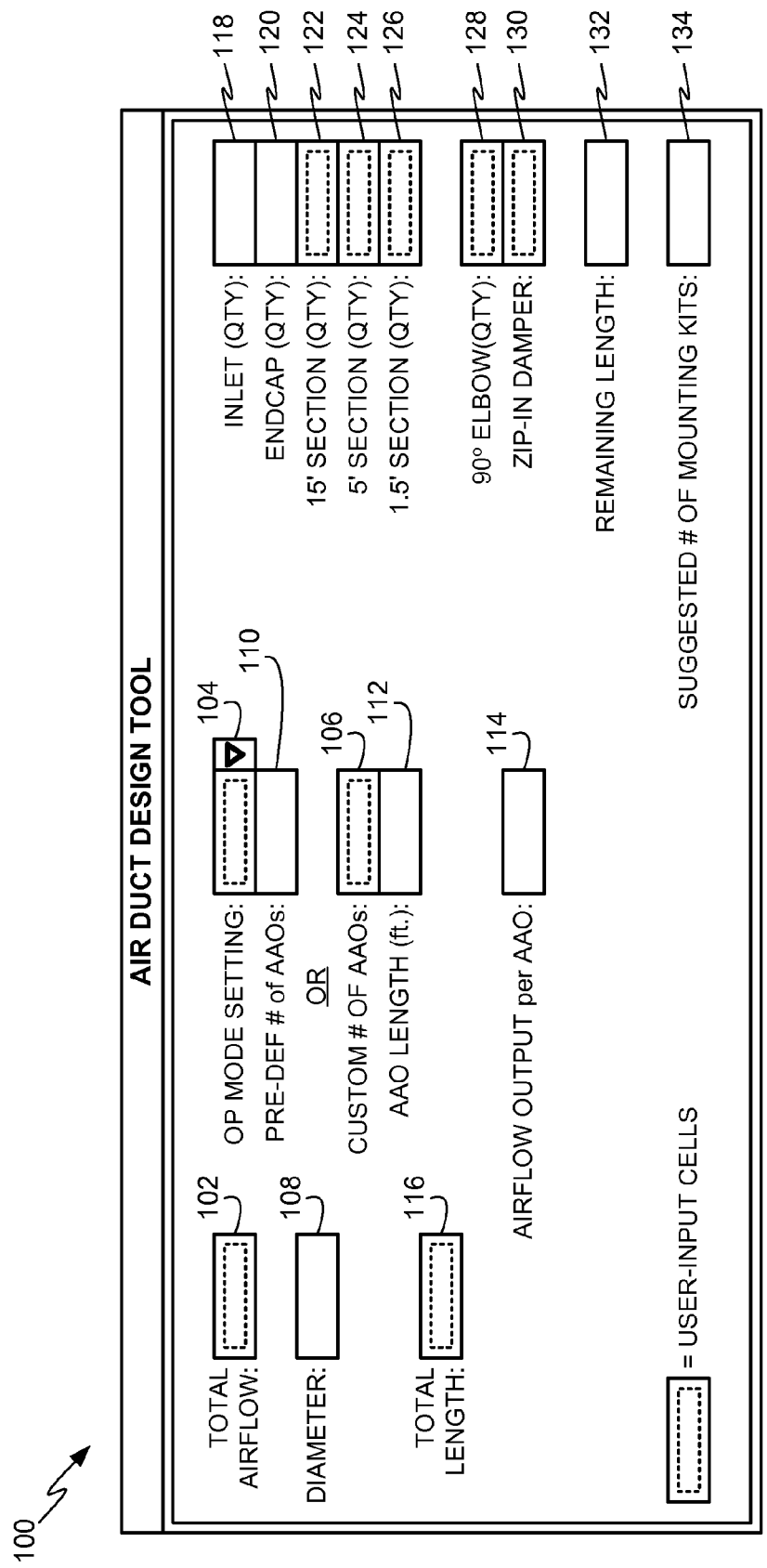
FIG. 1 is an example duct design user interface for an air duct design tool that may be used to determine quantities of duct sections for constructing air duct systems.

The example methods, apparatus, and articles of manufacture disclosed herein may be used to determine air duct system configurations. In the illustrated examples described herein, such air duct systems are implemented using pliable air ducts formed of fabric and configured to expand upon movement of airflow therethrough and collapse during the absence of airflow. Such pliable air ducts are sometimes referred to as fabric ducting, duct socks, air socks, or textile ducts. Example pliable air ducts that may be configured using the example techniques disclosed herein are disclosed in U.S.

patent application Ser. No. 12/772,863, filed on May 3, 2010, and titled "Configurable Pliable Air Ducts," which is hereby incorporated by reference herein in its entirety. In other example implementations, the example methods, apparatus, and articles of manufacture disclosed herein may similarly be used to determine air duct system configurations for air duct systems formed of sheet metal or any other type of material.

An example method in accordance with the teachings disclosed herein involves receiving an airflow rate value indicative of airflow through an air delivery duct system and receiving one of a custom quantity of adjustable air outlet (AAO) duct sections or an operating mode identifier associated with an amount of air delivered by the air delivery duct system into targeted areas. When the operating mode identifier is received, the example method further involves providing a pre-defined quantity of AAO duct sections to configure the air delivery duct system based on the airflow rate and the operating mode identifier. In the illustrated examples described herein, each AAO duct section includes at least one adjustable air outlet having at least one size-adjustable airflow output orifice. For example, each size-adjustable airflow output orifice may be adjusted to any one of a small-sized orifice, a medium-sized orifice, or a large-sized orifice to meet the airflow output demands for each AAO duct section. The example method further involves determining an airflow output value for the at least one size-adjustable airflow output orifice based on the custom quantity operating mode identifier and a duct diameter or based on the operating mode identifier and the duct diameter.

An example article of manufacture to select active air duct sections to form an air duct system in accordance with the teachings disclosed herein includes an outer sleeve template having an aperture formed therein and indicia located adjacent to the aperture. The indicia include an airflow indicium, a duct diameter indicium, and quantity of active duct sections indicium. The active duct sections are configured to output airflow therefrom. The example article of manufacture further includes an inner slide card having a first plurality of data sets located thereon, each of which includes an airflow rate value, a duct diameter value, and an active duct sections quantity value. The inner slide card is slideably received in the outer sleeve template, and each of the data sets appears separately through the first aperture formed in the outer sleeve template to align the airflow rate value with the airflow indicia, align the duct diameter value with the duct diameter indicia, and align the quantity of active duct sections value with the quantity of active duct sections indicia.

Turning to FIG. 1, an example duct design user interface 100 for an air duct design tool may be used to determine quantities of duct sections for air duct systems. Installers of duct systems or heating, ventilating, and air conditioning (HVAC) systems may use the duct design user interface 100 to determine the quantities of active duct sections and non-active duct sections required to install air duct systems having particular airflow and duct length requirements. The duct design user interface 100 may be implemented using a processor system (e.g., the processor system 1210 of FIG. 12) and provide air duct system configuration information in response to user input. An example air duct system 200 that may be configured using the duct design user interface 100 is shown in FIG. 2.

Figure 2:
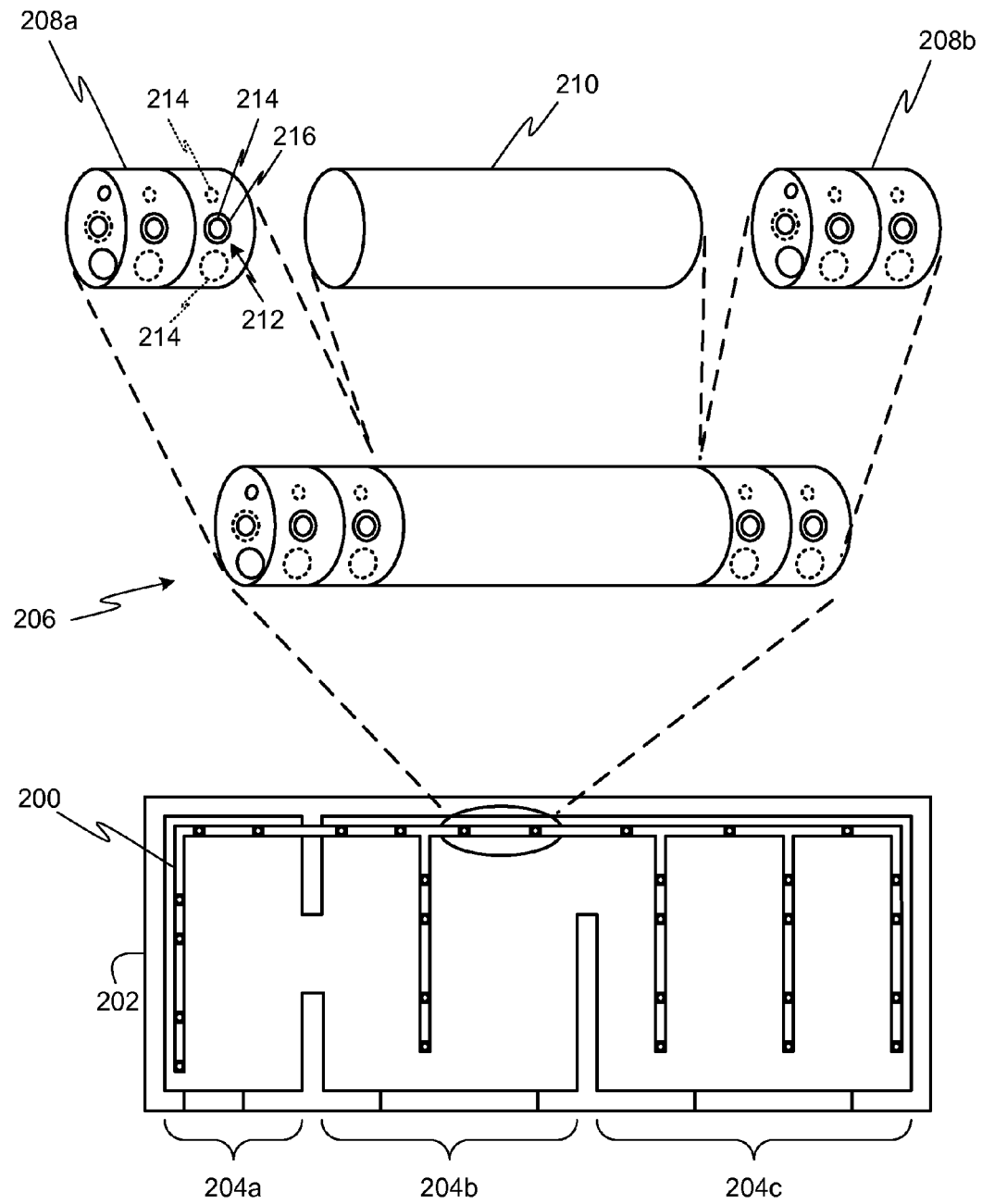
FIG. 2 is an example air delivery duct system formed using adjustable airflow outlet (AAO) sections.

Turning briefly to FIG. 2, the air duct system 200 is shown in connection with a building facility 202 having air delivery target areas 204a-c. A portion 206 of the air duct system 200 is shown in magnified view and includes two active duct sections 208a-b and a non-active duct section 210. The active duct sections 208a-b are also referred to herein as adjustable air outlets (AAOs) or AAO sections. The AAO sections 208a-b are active duct sections because they include size-adjustable airflow output orifices 212 through which air is output from the air duct system 200 into the air delivery target areas 204a-c to condition (e.g., heat or cool) the environment therein. The non-active duct section 210, also referred to herein as a blank, is non-active because air is not output therefrom. Instead, the non-active duct section 210 (and other non-active duct sections of the air duct system 200) enables air to flow therethrough to reach active duct sections (e.g., the AAO sections 208a-b) of the air duct system 200.

The air duct system 200 of FIG. 2 may be constructed using any technique described in U.S. patent application Ser. No. 12/772,863 or any other techniques. For example, each of the AAO sections 208a-b may include an inner fabric surrounded by an outer fabric in a slideable relationship with one another. The inner fabric may include two or more differently sized orifices 214, while the outer fabric may include a single orifice 216 alignable with each of the two or more differently sized orifices 214. In such a configuration, each size-adjustable airflow output orifice 212 may be set to a particular size by aligning one of the differently sized orifices 214 with the orifice 216. The air duct system 200 of FIG. 2 may be constructed using multiple active sections substantially similar or identical to the AAO sections 208a-b and multiple non-active sections substantially similar or identical to the non-active duct section 210 by interlocking or attaching such sections to one another. The quantity of active and non-active duct sections may be selected using the example duct design user interface 100 of FIG. 1.

Returning to FIG. 1, the example duct design user interface 100 and its various parts are described herein as being used to design the air duct system 200 of FIG. 2. However, the duct design user interface 100 may similarly be used to design other air duct systems having different configurations and operating requirements. In addition, although some processes are described herein as being performed by the duct design user interface 100, it should be understood that such processes may be performed by underlying machine readable instructions executed to implement the duct design user interface 100 and to implement analysis and calculation operations to determine values or information displayed via the duct design user interface 100.

In the illustrated example of FIG. 1, the duct design user interface 100 includes user-input fields to receive user input information and data-output fields to provide information calculated or determined based on the user input information and/or other information as described below. As shown, the duct design user interface 100 includes a total airflow field 102, an operating mode field 104, and a custom AAO quantity field 106. In the illustrated example, the total airflow field 102 is provided to receive user input indicative of a total airflow rate (e.g., an airflow rate in cubic feet per minute (CFM)) intended to be delivered through an air duct system such as the air duct system 200 of FIG. 2.

The operating mode field 104 is provided to receive user input selection of an airflow output operating mode. In the illustrated examples described herein, three airflow output operating modes selectable from a drop-down list of the operating mode field 104 include a LOW airflow output operating mode, a MEDIUM airflow output operating mode, and a HIGH airflow output operating mode. Each of the LOW, MEDIUM, and HIGH airflow output operating modes is configured to output a particular amount of airflow (e.g., a low airflow rate output, a medium airflow rate output, and a high airflow rate output) from the air duct system 200. The exact amount of output airflow rate corresponding to the LOW, MEDIUM, and HIGH operating modes is directly proportional to the total airflow rate provided in the total airflow field 102. As described in greater detail below, the airflow output operating mode selected in the operating mode field 104 is used to determine a corresponding quantity of active duct sections (e.g., the AAO sections 208a-b of FIG. 2) that should be used to construct the air duct system 200.

In some example implementations, instead of providing airflow output operating modes selectable using LOW, MEDIUM, and HIGH indicator in the operating mode field 104, the operating mode field 104 may be configured to allow selections of airflow output operating modes based on numeric percentage values or some other relative scale values. For example, percentage values provided in the operating mode field 104 may allow selections of 0% to 100% airflow output operating modes at 1-percent increments or any other increment values (e.g., 10-percent increments). In such example implementations, the duct design user interface 100 may provide a guide indicating that 20% is equal to or approximately equal to a low airflow output operating mode (i.e., 20%=LOW), 50% is equal to or approximately equal to a medium airflow output operating mode (i.e., 50%=MEDIUM), and that 100% is equal to or approximately equal to a high airflow output operating mode (i.e., 100%=HIGH).

The custom AAO quantity field 106 is provided to receive user input indicative of a custom quantity of active duct sections (e.g., the AAO sections 208a-b of FIG. 2). In the illustrated example of FIG. 1, a user can either select an airflow output operating mode in the operating mode field 104 to cause the duct design user interface 100 to output a recommended quantity of active duct sections to use in the air duct system 200, or the user can enter a custom quantity of active duct sections in the customizable AAO configuration field 106. In some instances, users may elect to enter a custom quantity of active duct sections in the custom AAO quantity field 106 to output an airflow amount from the air duct system 200 that is different from airflow outputs provided by the LOW, MEDIUM, and HIGH airflow output operating modes available via the operating mode field 104. For example, it may be desired to have an airflow output that is between the MEDIUM and HIGH airflow outputs or between the LOW and MEDIUM airflow outputs.

As shown in FIG. 1, the duct design user interface 100 also includes a diameter field 108, a pre-defined quantity of AAOs field 110, an AAO length field 112, and an airflow output per AAO field 114. In the diameter field 108, the duct design user interface 100 provides an air duct diameter recommended for use with the total airflow rate specified in the total airflow field 102. In the illustrated example, the duct design user interface 100 determines the air duct diameter output in the diameter field 108 by using the user-specified total airflow rate (in the total airflow field 102) to reference an example airflow range data structure or look-up table 300 of FIG. 3 that stores air duct diameters 302 in connection with respective airflow ranges 304.

The pre-defined quantity of AAOs field 110 is provided to indicate pre-defined quantities of active duct sections (e.g., the AAO sections 208a-b) recommended for constructing the air duct system 200 based on the total airflow rate in the total airflow field 102 and the airflow output operating mode selected in the operating mode field 104. In particular, the duct design user interface 100 can determine the pre-defined quantity of active duct sections to output in the quantity of AAOs field 110 based on Equation 1 below.

$$P\_AAO\# = RNDUP(AIRFLOW_{TOT}/AAO_{CFM})$$ Equation 1

In Equation 1 above, the pre-defined quantity of active duct sections ($P\_AAO_{CFM}$) (e.g., one or more active duct sections similar or identical to the AAO sections 208a-b of FIG. 2) is determined by dividing a total airflow rate value (AIRFLOW$_{TOT}$) by an active section airflow output capacity (AAO$_{CFM}$) and rounding up (RNDUP) the resulting quotient. In the illustrated example, the total airflow rate value (AIRFLOW$_{TOT}$) is the total airflow rate specified in the total airflow field 102. The active section airflow capacity (AAO$_{CFM}$) is the airflow capacity rating for a single active duct section (e.g., one of the AAO sections 208a-b of FIG. 2) having a diameter indicated in the diameter field 108 and its size-adjustable airflow output orifices (e.g., the size-adjustable airflow output orifice 212 of FIG. 2) sized according to an airflow output operating mode selected in the operating mode field 104. In the illustrative examples described herein, size-adjustable airflow output orifices (e.g., the size-adjustable airflow output orifice 212 of FIG. 2) are sized to be small openings when the airflow output operating mode selected in the operating mode field 104 is LOW, sized to medium openings for a MEDIUM airflow output operating mode, and sized to large for a HIGH airflow output operating mode.

In the illustrated examples described herein, the duct design user interface 100 determines the appropriate active section airflow output capacity (AAO$_{CFM}$) value to use in Equation 1 based on an example AAO section airflow data structure 400 of FIG. 4 that is indicative of airflow outputs per AAO section for different airflow output operating modes 402 and different air duct diameters 404. For example, if the air duct diameter indicated in the diameter field 108 is 12" (12 inches) and the airflow output operating mode selected in the operating mode field 104 is LOW, the duct design user interface 100 selects a 140 CFM airflow value from the AAO section airflow data structure 400 for the active section airflow output capacity (AAO$_{CFM}$) value to use in Equation 1.

The AAO length field 112 is provided to indicate the total length of air ducting provided by the pre-defined quantity of active duct sections indicated in the pre-defined quantity of AAOs field 110 (e.g., when an airflow output operating mode is selected in the operating mode field 104). Alternatively, the AAO length field 112 may indicate the total length of air ducting provided by the custom quantity of active duct sections (C_AAO#) provided by a user input in the customizable AAO configuration field 106. The air duct length may be determined by multiplying the pre-defined or custom quantity of active duct sections (e.g., indicated in the quantity of AAOs field 110 or provided in the customizable AAO configuration field 106) by the individual length of each active duct section (AAO$_{LENGTH}$) (e.g., Total AAO length=P_AAO#×AAO$_{LENGTH}$ or Total AAO length=C_AAO#×AAO$_{LENGTH}$).

In some example implementations, error messages may be displayed when certain conditions related to minimum and maximum airflow output thresholds for different duct diameters are not met when calculating the total length of air ducting to be displayed in the AAO length field 112. For example, if the total airflow rate provided in the total airflow field 102 divided by the quantity of active duct sections (AAO#) is less than a minimum airflow output threshold value (($AIRFLOW_{TOT}/AAO\#$)<$AAO\_AIRFLOW_{MIN}$)) (e.g., each of the active duct sections provides less than a minimum airflow output), the duct design user interface 100 can display an error message indicating that the quantity of active duct sections (AAO#) must be decreased. Alternatively, if the total airflow rate provided in the total airflow field 102 divided by the quantity of active duct sections (AAO#) is greater than a maximum airflow output threshold value (($AIRFLOW_{TOT}/AAO\#$)>$AAO\_AIRFLOW_{MAX}$)) (e.g., each of the active duct sections provides more than a maximum airflow output), the duct design user interface 100 can display an error message indicating that the quantity of active duct sections (AAO#) must be increased. In the illustrated examples described herein, minimum and maximum airflow output threshold values may be based on the per-diameter airflow output values of the LOW and HIGH airflow output operating modes, respectively, shown in the AAO section airflow data structure 400 of FIG. 4. For example, a minimum airflow output threshold value for a 12" diameter duct can be 140 CFM (corresponding to the LOW airflow output operating mode), and a maximum airflow output threshold value for a 12" diameter duct can be 260 CFM (corresponding to the HIGH airflow output operating mode).

The airflow output per AAO field 114 is provided to indicate the airflow output by each active duct section indicated in the custom AAO quantity field 106 or the pre-defined quantity of AAOs field 110. In the illustrated example, if a user selects one of the airflow output operating modes in the operating mode field 104, the duct design user interface 100 can retrieve the active section airflow output capacity value ($AAO_{CFM}$) to display in the airflow output per AAO field 114 from the AAO section airflow data structure 400 of FIG. 4 based on the selected airflow output operating mode in the operating mode field 104 and the diameter in the diameter field 108. For example, if the diameter in the diameter field 108 is 16" and the selected airflow output operating mode is MEDIUM, the duct design user interface 100 can display 280 CFM (selected from the AAO section airflow data structure 400) in the airflow output per AAO field 114. Alternatively, if a user provides a custom quantity of active duct sections (C_AAO#) in the custom AAO quantity field 106, the duct design user interface 100 can determine the active section airflow output capacity value ($AAO_{CFM}$) to display in the airflow output per AAO field 114 by dividing the total airflow rate ($AIRFLOW_{TOT}$) in the total airflow field 102 by the custom quantity of active duct sections (C_AAO#) in the custom AAO quantity field 106 (i.e., $AAO_{CFM}=AIRFLOW_{TOT}/C\_AAO\#$).

In the illustrated example of FIG. 1, the duct design user interface 100 also includes a total length field 116, an inlet quantity field 118, an endcap quantity field 120, a 15' section quantity field 122, a 5' section quantity field 124, a 1.5' section quantity field 126, a 90° elbow quantity field 128, a zip-in damper field 130, a remaining length field 132, and a suggested quantity of mounting kits field 134. The total length field 116 is provided to receive user input indicative of the total length of air ducting (active and non-active air ducting) required to construct an air duct system (e.g., the air duct system 200 of FIG. 2). A user may base such a length on, for example, the size and/or volume of the target area(s) (e.g., the target areas 204a-c of FIG. 2) intended to be conditioned (e.g., heated or cooled).

The duct design user interface 100 uses the inlet quantity field 118 to output the quantity of inlet duct sections needed to implement an air duct system in accordance with the user-provided parameters and uses the outlet quantity field 120 to output the quantity of outlet duct sections needed to implement the air duct system. The 15' section quantity field 122, the 5' section quantity field 124, and the 1.5' section quantity field 126 are provided to enable users to input quantities of different length (e.g., 15-foot sections, 5-foot sections, or 1.5 foot sections) non-active duct sections (e.g., the non-active duct section 210 of FIG. 2) for use in constructing an air duct system (e.g., the air duct system 200 of FIG. 2). In the illustrated example, a user may select any combination of different length sections that can be used to complete the total length of air ducting specified in the total length field 116.

The 90° elbow quantity field 128 and the zip-in damper field 130 are provided to enable a user to specify a quantity of 90° elbow duct sections and damper duct sections, respectively, required to construct, for example, the air duct system 200 of FIG. 2.

To assist users in making selections for the 15' section quantity field 122, the 5' section quantity field 124, and the 1.5' section quantity field 126, the duct design user interface 100 is provided with the remaining length field 132, which outputs a duct length value that equals the difference between the total length of air ducting specified in the total length field 116 and the sum of the total active duct length ($AAO_{LENGTH}$) indicated in the AAO length field 112 and the lengths of sections indicated in the inlet quantity field 118, the endcap quantity field 120, the 15' section quantity field 122, the 5' section quantity field 124, the 1.5' section quantity field 126, 90° elbow quantity field 128, and the zip-in damper field 130 and the total length of air ducting in the AAO length field 112 (i.e., remaining length=total length−$AAO_{LENGTH}$+Σ(length (inlet section(s)), length(endcap section(s)), length(15' section(s)), length(5' section(s)), length(1.5' section(s)), length (90° elbow section(s)), length(zip-in damper section(s)))).

The suggested quantity of mounting kits field 134 is provided to enable the duct design user interface 100 to output a quantity of cable assembly kits recommended for constructing, for example, the air duct system 200 of FIG. 2. In the illustrated example, a cable assembly kit includes hardware (e.g., thumbuckles, thimbles, eyebolts, cable clamps, and a length of cable) for air duct section (active and non-active sections) specified in the duct design user interface 100 to install, for example, the air duct system 200.

FIG. 5 is an example pre-defined AAO configuration user interface 500 that may be used in connection with the example duct design user interface 100 of FIG. 1 to select adjustable airflow output orifice sizes of active duct sections (e.g., the AAO sections 208a-b of FIG. 2) for delivering air into targeted areas (e.g., the targeted areas 206a-c of FIG. 2). In particular, the example pre-defined AAO configuration user interface 500 is used when a user selects an airflow output operating mode in the operating mode field 104 of FIG. 1.

As shown in FIG. 5, the pre-defined AAO configuration user interface 500 is provided with an orifice airflow matrix 502 to indicate airflow outputs through each of four size-adjustable airflow output orifices of active duct sections (e.g., the size-adjustable airflow output orifices 212 of the AAO sections 208a-b of FIG. 2). In the illustrated example, each of the four size-adjustable airflow output orifices is identified by a respective location on an active duct section including a front-right location, a front-left location, a back-right location, and a back-left location. In other example implementations, active duct sections having fewer or more size-adjustable airflow output orifices may be used instead.

In the illustrated example of FIG. 5, the pre-defined AAO configuration user interface 500 indicates an airflow output value for each of the size-adjustable airflow output orifices in the orifice airflow matrix 502. The indicated airflow output values correspond to the duct diameter indicated in the diameter field 108 and the airflow output operating mode selected in the operating mode field 104 of FIG. 1. In the illustrated example, the pre-defined AAO configuration user interface 500 accesses an example adjustable orifice airflow output data structure 700 of FIG. 7 based on the indicated duct diameter and the selected airflow output operating mode to obtain the corresponding orifice airflow outputs.

Figure 7:
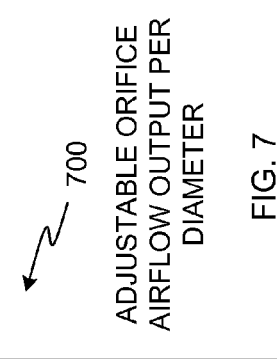
FIG. 7 is an example adjustable orifice airflow output data structure indicative of airflow output levels for differently sized orifices of AAO sections having different diameters.

Turning briefly to FIG. 7, the adjustable orifice airflow output data structure 700 of FIG. 7 stores the airflow outputs for different orifice sizes and corresponding to different duct diameters. For example, for a 12" diameter duct, a small orifice-size airflow ($S_{AIRFLOW}$) is equal to 35 CFM, a medium orifice-size airflow ($M_{AIRFLOW}$) is equal to 50 CFM, and a large orifice-size airflow ($L_{AIRFLOW}$) is equal to 65 CFM.

Returning to FIG. 5, to determine the airflow output values to display for the size-adjustable airflow output orifices in the orifice airflow matrix 502, the pre-defined AAO configuration user interface 500 retrieves small orifice-size airflow values from the adjustable orifice airflow output data structure 700 when users select a LOW output operating mode in the operating mode field 104, retrieves medium orifice-size airflow values when users select a MEDIUM output operating mode, and retrieves large orifice-size airflow values when users select a HIGH output operating mode. To enable users to view the low, medium, and high orifice-size airflow values for a respective duct diameter, the pre-defined AAO configuration user interface 500 is provided with an orifice size-to-airflow output table 504, into which the pre-defined AAO configuration user interface 500 copies airflow output values from the adjustable orifice airflow output data structure 700. In some example implementations, the pre-defined AAO configuration user interface 500 may output airflow output values in the orifice airflow matrix 502 based on the airflow output values in the orifice size-to-airflow output table 504 instead of accessing the adjustable orifice airflow output data structure 700.

In the illustrated example of FIG. 5, the pre-defined AAO configuration user interface 500 is also provided with an active duct section airflow sum field 506, in which the sum of the airflow output values from the orifice size-to-airflow output table 504 is indicated. Thus, the value in the active duct section airflow sum field 506 is the airflow output by each active duct section indicated in the pre-defined quantity of AAOs field 110. In addition, the value in the active duct section airflow sum field 506 is equal to the value in the airflow output per AAO field 114.

FIG. 6 is an example customizable AAO configuration user interface 600 that may be used in connection with the example duct design user interface 100 of FIG. 1 to select adjustable airflow output orifice sizes of active duct sections (e.g., the AAO sections 208a-b of FIG. 2) for delivering air into targeted areas (e.g., the targeted areas 206a-c of FIG. 2). In particular, the example pre-defined AAO configuration user interface 500 is used when a user indicates a custom quantity of active duct sections in the custom AAO quantity field 106 of FIG. 1. As shown in FIG. 6, the customizable AAO configuration user interface 600 is provided with an orifice airflow matrix 602 similar to the orifice airflow matrix 502 of FIG. 5. The customizable AAO configuration user interface 600 also includes an orifice size-to-airflow output table 604 similar to the orifice size-to-airflow output table 504 of FIG. 5. In the illustrated example, the customizable AAO configuration user interface 600 populates the orifice size-to-airflow output table 604 based on airflow output values in the adjustable orifice airflow output data structure 700 of FIG. 7 corresponding to an air duct diameter indicated in the diameter field 108.

Unlike the pre-defined AAO configuration user interface 500, in which the values therein are determined by the user interface 500, the customizable AAO configuration user interface 600 enables users to select different airflow output size-adjustable orifice sizes in the orifice airflow matrix 602 to configure active duct sections having airflow outputs substantially equal to or less than the value in the airflow output per AAO field 114 of FIG. 1. For example, a user may select each airflow value for each airflow output size-adjustable orifice represented in the orifice airflow matrix 602 using a drop-down list user interface control. The values populated in such a drop-down list can be obtained from the orifice size-to-airflow output table 604. An active duct section airflow sum field 606 similar to the active duct section airflow sum field 506 of FIG. 5 enables the customizable AAO configuration user interface 600 to display the sum of the user-selected airflow output values selected in the orifice size-to-airflow output table 604. In this manner, a user can change the airflow output value selections in the orifice airflow matrix 602 until the airflow output sum in the active duct section airflow sum field 606 is substantially equal to or less than the value in the airflow output per AAO field 114.

Figure 13:
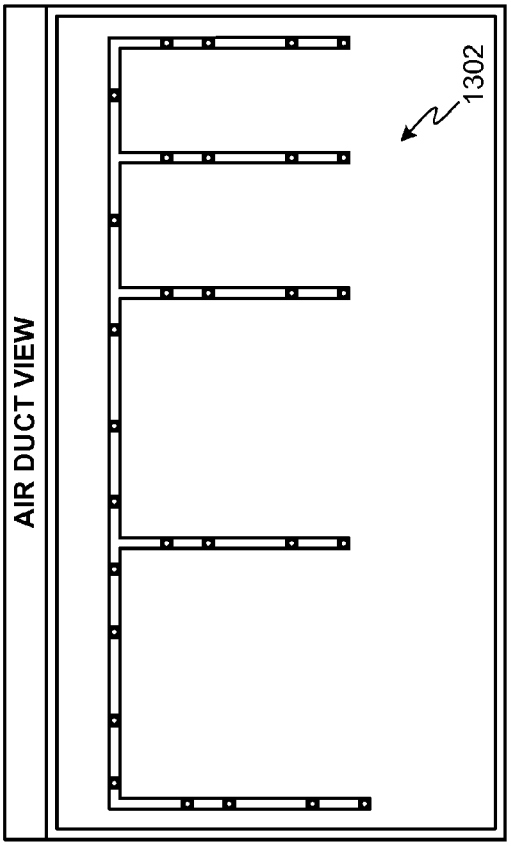
FIG. 13 depicts an example air duct view user interface to generate and display a visual depiction of air duct systems configured according to parameter values in the duct design user interface of FIG. 1, the pre-defined AAO configuration user interface of FIG. 5, and/or the customizable AAO configuration user interface of FIG. 6.

Turning to FIG. 13, in some example implementations, the duct design user interface 100 may invoke the display of an air duct view user interface 1300 to generate and display a visual depiction 1302 of air duct systems (e.g., the air duct system 200 of FIG. 2) configured according to the parameters in the duct design user interface 100, the pre-defined AAO configuration user interface 500, and/or the customizable AAO configuration user interface 600. In some example implementations, the air duct view user interface 1302 may be provided with drawing, selection, move, and other editing tools to allow a user to re-arrange physical layouts of depicted air duct systems.

Figure 8:
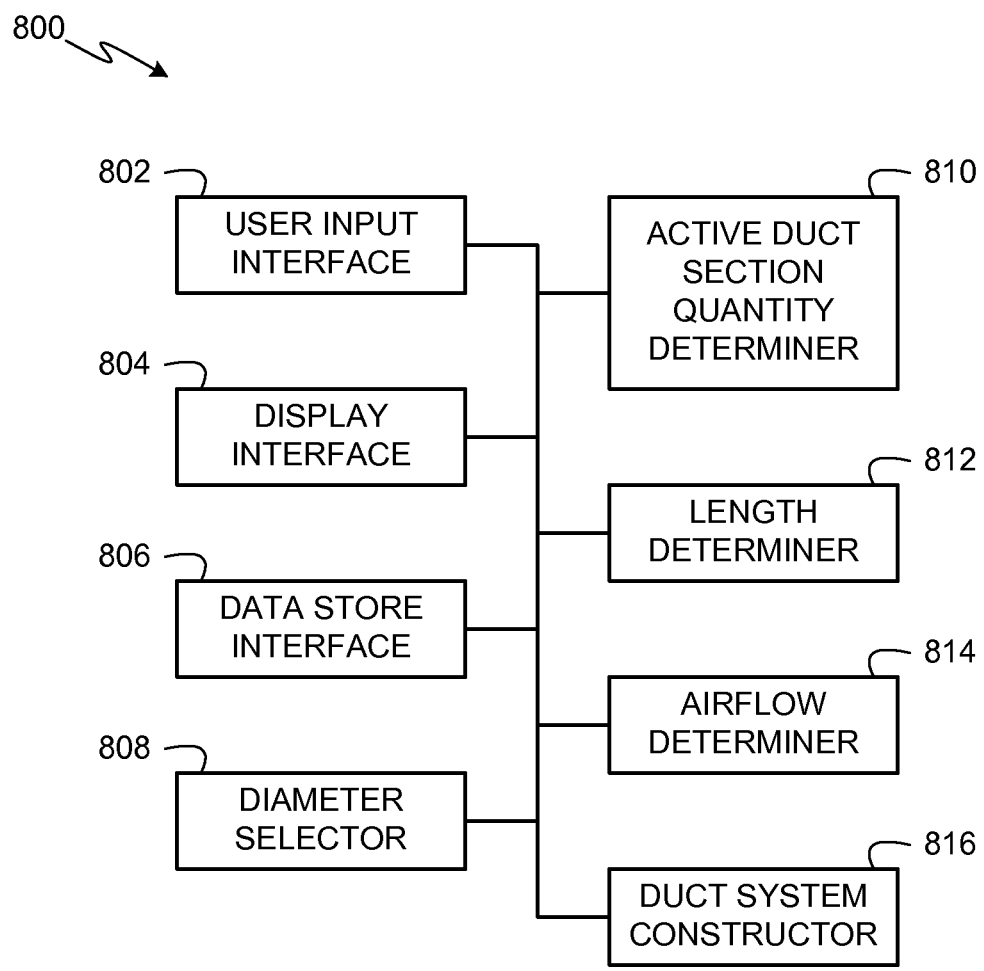
FIG. 8 is a block diagram of an example apparatus that may be used to implement the example techniques disclosed herein.

FIG. 8 is a block diagram of an example apparatus 800 that may be used to implement the example techniques disclosed herein such as the processes and operations described above in connection with the example duct design user interface 100 of FIG. 1, the example pre-defined AAO configuration user interface 500 of FIG. 5, and the example customizable AAO configuration user interface 600 of FIG. 6. In the illustrated example of FIG. 8, the apparatus 800 includes an example user input interface 802, an example display interface 804, an example data store interface 806, an example diameter selector 808, an example active duct section quantity determiner 810, an example length determiner 812, an example airflow determiner 814, and an example duct system constructor 816. While an example manner of implementing the apparatus 800 has been illustrated in FIG. 8, one or more of the elements, processes and/or devices illustrated in FIG. 8 may be combined, divided, re-arranged, omitted, eliminated and/or implemented in any other way. Further, the example user input interface 802, the example display interface 804, the example data store interface 806, the example diameter selector 808, the example active duct section quantity determiner 810, the example length determiner 812, the example airflow determiner 814, and the example duct system constructor 816 and/or, more generally, the example apparatus 800 of FIG. 8 may be implemented by hardware, software, firmware and/or any combination of hardware, software and/or firmware. Thus, for example, any of the example user input interface 802, the example display interface 804, the example data store interface 806, the example diameter selector 808, the example active duct section quantity determiner 810, the example length determiner 812, the example airflow determiner 814, and the example duct system constructor 816 and/or, more generally, the example apparatus 800 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example user input interface 802, the example display interface 804, the example data store interface 806, the example diameter selector 808, the example active duct section quantity determiner 810, the example length determiner 812, the example airflow determiner 814, or the example duct system constructor 816 is hereby expressly defined to include a computer readable medium such as a memory, DVD, CD, etc. storing the software and/or firmware. Further still, the example apparatus 800 of FIG. 8 may include one or more elements, processes and/or devices in addition to, or instead of, those illustrated in FIG. 8, and/or may include more than one of any or all of the illustrated elements, processes and devices.

Turning in detail to FIG. 8, the user input interface 802 is provided to enable the apparatus 800 to receive or retrieve user-input values provided by users into user-input fields of the duct design user interface 100 of FIG. 1 and the customizable AAO configuration user interface 600 of FIG. 6 (e.g., the total airflow field 102, the operating mode field 104, the custom AAO quantity field 106, the total length field 116, the 15' section quantity field 122, the 5' section quantity field 124, the 1.5' section quantity field 126, the 90 elbow quantity field 128, the zip-in damper field 130 of FIG. 1, and the orifice airflow matrix 602 of FIG. 6).

The display interface 804 is provided to enable the apparatus 800 to output information via data-output fields of the duct design user interface 100, the pre-defined AAO configuration user interface 500 of FIG. 5, and the customizable AAO configuration user interface 600 (e.g., the diameter field 108, the pre-defined quantity of AAOs field 110, the AAO length field 112, the airflow output per AAO field 114, the inlet quantity field 118, the endcap quantity field 120, the remaining length field 132, and the suggested quantity of mounting kits field 134 of FIG. 1; the orifice airflow matrix 502, the orifice size-to-airflow output table 504, and the active duct section airflow sum field 506 of FIG. 5; and the orifice airflow matrix 602, the orifice size-to-airflow output table 604; and the active duct section airflow sum field 606 of FIG. 6).

The data store interface 806 is provided to enable the apparatus 800 to access information stored in memory or in data structures such as the airflow range data structure 300 of FIG. 3, the AAO section airflow data structure 400 of FIG. 4, and the adjustable orifice airflow output data structure 700 of FIG. 7.

The diameter selector 808 is provided to enable the apparatus 800 to select one of the air duct diameters in the airflow range data structure 300 based on a user-input total airflow in the total airflow field 102 of FIG. 1. Air duct diameters selected by the diameter selector 808 can be displayed using the display interface 804 in the diameter field 108.

The active duct section quantity determiner 810 is provided to enable the apparatus 800 to determine quantities of active duct sections (e.g., the AAO sections 208a-b of FIG. 2) for use in constructing, for example, the air duct system 200 of FIG. 2. Values determined using the active duct section quantity determiner 810 can be displayed using the display interface 804 in the pre-defined quantity of AAOs field 110 of FIG. 1.

The length determiner 812 is provided to enable the apparatus 800 to determine air duct lengths corresponding to active and non-active duct sections indicated in the duct design user interface 100. The air duct lengths can be displayed using the display interface 804 in the AAO length field 112 and the remaining length field 132 of FIG. 1.

The airflow determiner 814 is provided to enable the apparatus 800 to determine airflow outputs based on information in the duct design user interface 100, the pre-defined AAO configuration user interface 500, and the customizable AAO configuration user interface 600. Airflow output values may be displayed using the display interface 804 in the airflow output per AAO field 114 of FIG. 1, the active duct section airflow sum field 506 of FIG. 5, and the active duct section airflow sum field 606 of FIG. 6.

The duct system constructor 816 is provided to enable the apparatus 800 to generate visual depictions of air duct systems configured according to parameter values in the duct design user interface 100 of FIG. 1, the pre-defined AAO configuration user interface 500 of FIG. 5, and/or the customizable AAO configuration user interface 600 of FIG. 6. The display interface 804 may display the visual depiction of the air duct systems in the air duct viewer user interface 1300 of FIG. 13.

Figure 9A:
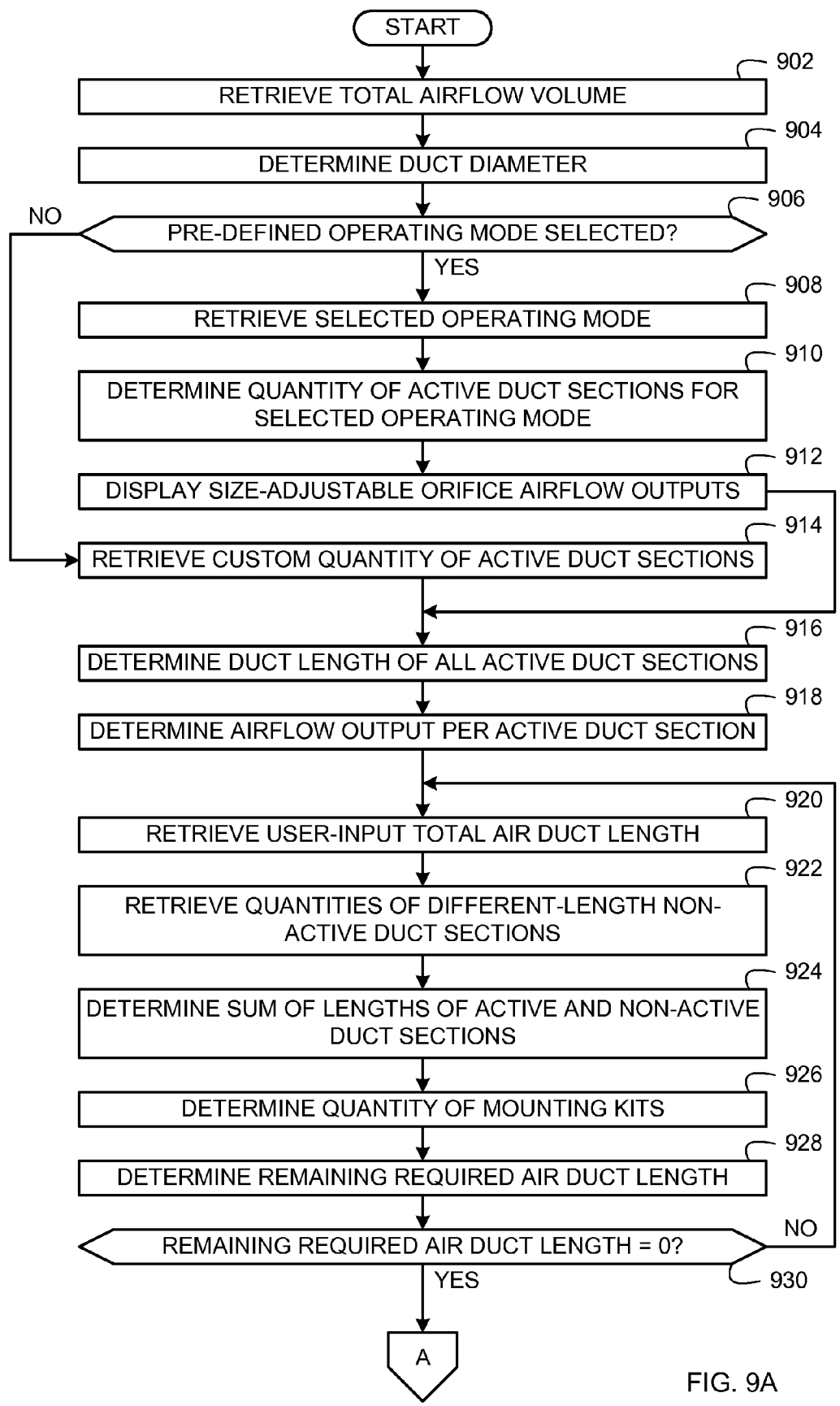
FIGS. 9A and 9B depict an example flow diagram representative of machine readable instructions that may be executed to determine quantities of duct sections for air duct systems using the example duct design user interface of FIG. 1.
Figure 9B:
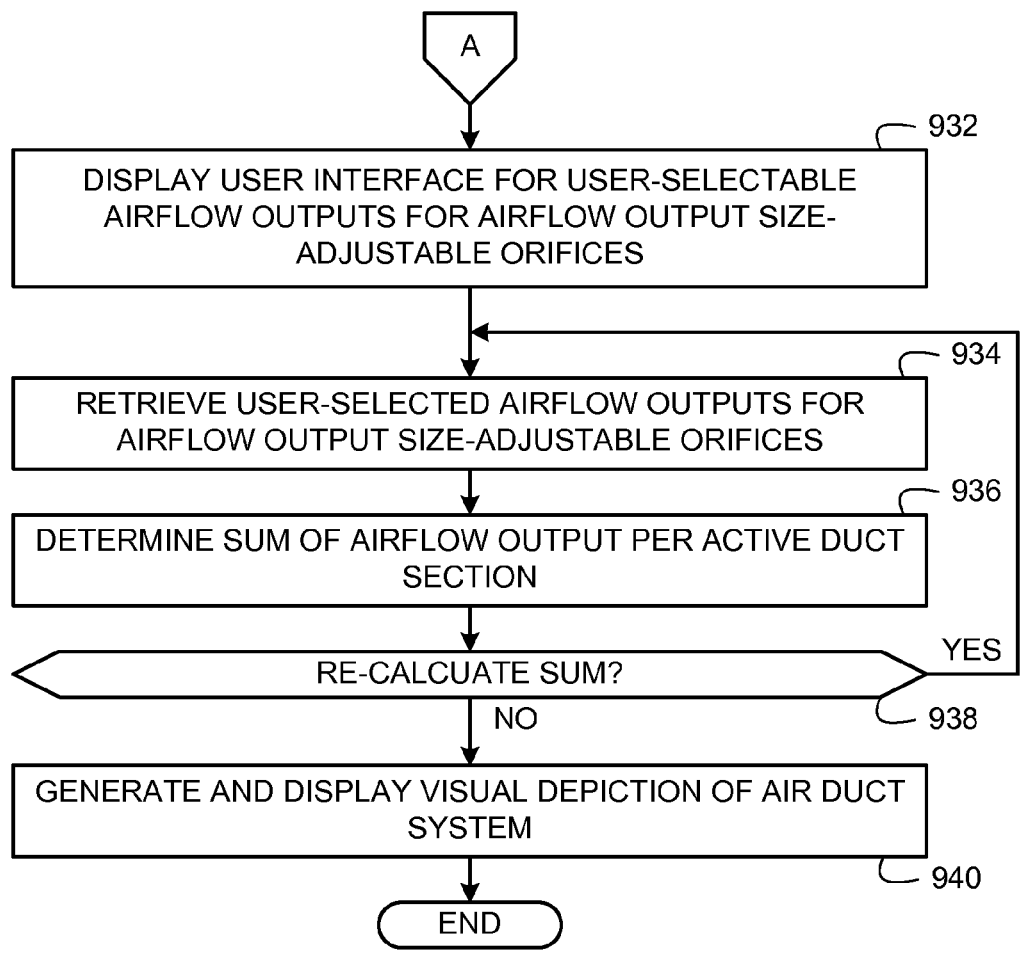

A flowchart representative of example machine readable instructions for implementing the apparatus 800 of FIG. 8 is shown in FIGS. 9A and 9B. In this example, the machine readable instructions comprise a program for execution by a processor such as the processor 1212 shown in the example computer 1210 discussed below in connection with FIG. 12. The program may be embodied in software stored on a computer readable medium such as a CD-ROM, a floppy disk, a hard drive, a digital versatile disk (DVD), or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 9A and 9B, many other methods of implementing the example apparatus 800 may alternatively be used. For example, the order of execution of the blocks may be changed, and/or some of the blocks described may be changed, eliminated, or combined.

As mentioned above, the example process of FIGS. 9A and 9B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIGS. 9A and 9B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The program of FIGS. 9A and 9B begins at block 902 at which the user input interface 802 (FIG. 8) retrieves the total airflow rate ($AIRFLOW_{TOT}$) from the total airflow field 102 (FIG. 1) (block 902) (FIG. 9A). The diameter selector 808 (FIG. 8) determines the air duct diameter corresponding to the retrieved total airflow rate (block 904). For example, the diameter selector 808 may retrieve an air duct diameter from the airflow range data structure or look-up table 300 of FIG. 3 corresponding to the total airflow rate. The display interface 804 (FIG. 8) may display the air duct diameter in the diameter field 108 of FIG. 1.

The user input interface 802 (FIG. 8) determines whether an airflow output operating mode has been selected in the operating mode field 104 (FIG. 1) (block 906). If an airflow output operating mode has been selected, the user input interface 802 retrieves the selected operating mode from the operating mode field 104 (block 908). The active duct section quantity determiner 810 (FIG. 8) determines the pre-defined quantity of active duct sections (e.g., the AAO sections 208*a-b* of FIG. 2) recommended for the selected operating mode (block 910). For example, the active duct section quantity determiner 810 may determine the pre-defined quantity of active duct sections (P_AAO#) as described above in connection with Equation 1. The display interface 804 may display the pre-defined quantity of active duct sections (P_AAO#) in the pre-defined quantity of AAOs field 110 of FIG. 1. The display interface 804 displays the size-adjustable orifice airflow output values in the pre-defined AAO configuration user interface 500 (FIG. 5) (block 912). For example, the displayed size-adjustable orifice airflow output values may be retrieved by the data store interface 806 from the adjustable orifice airflow output data structure 700 of FIG. 7 based on the airflow output operating mode selected in the operating mode field 104 and the air duct diameter displayed in the diameter field 108.

If, instead, the user input interface 802 determines that an airflow output operating mode has not been selected (block 906), control bypasses blocks 908, 910, and 912, and the user input interface 802 retrieves a custom quantity of active duct sections from the custom AAO quantity field 106 (block 914). After retrieving the custom quantity of active duct sections at block 914 or after displaying the size-adjustable orifice airflow output values in the pre-defined AAO configuration user interface 500 at block 912, the length determiner 812 (FIG. 8) determines the combined duct length of all the active duct sections (e.g., the AAO sections 208*a-b* of FIG. 2) indicated by the quantity of active duct sections determined at block 910 or indicated by the custom quantity of active duct sections retrieved at block 914 (block 916). The display interface 804 may display the combined duct length of all the active duct sections in the AAO length field 112 (FIG. 1).

The airflow determiner 814 determines the airflow output per active duct section (AAO$_{CFM}$) (e.g., for each of the AAO sections 208*a-b*) (block 918). For example, if a user selects one of the airflow output operating modes in the operating mode field 104, the airflow determiner 814 can retrieve the active section airflow output value (AAO$_{CFM}$) from the AAO section airflow data structure 400 of FIG. 4 based on the selected airflow output operating mode in the operating mode field 104 and the diameter in the diameter field 108. For example, if the diameter in the diameter field 108 is 16" and the selected airflow output operating mode is MEDIUM, the airflow determiner 814 can retrieve 280 CFM from the AAO section airflow data structure 400. Alternatively, if a user provides a custom quantity of active duct sections in the custom AAO quantity field 106, the airflow determiner 814 can determine the active section airflow output value (AAO$_{CFM}$) by dividing the total airflow rate (AIRFLOW$_{TOT}$) in the total airflow field 102 by the custom quantity of active duct sections (C_AAO#) in the custom AAO quantity field 106 (i.e., AAO$_{CFM}$=AIRFLOW$_{TOT}$/AAO#). In either case, the display interface 804 can display the airflow output per active duct section (AAO$_{CFM}$) in the airflow output per AAO field 114.

The user input interface 802 retrieves a user-input total air duct length from the total length field 116 (FIG. 1) (block 920) and retrieves the quantities of different-length non-active duct sections (block 922) from the inlet quantity field 118, the endcap quantity field 120, the 15' section quantity field 122, the 5' section quantity field 124, the 1.5' section quantity field 126, 90° elbow quantity field 128, and the zip-in damper field 130. The length determiner 812 determines the sum of the lengths of the active duct sections and non-active duct sections (block 924). For example, the length determiner 812 can determine total non-active duct length by multiplying the non-active duct section quantities retrieved at block 922 by their respective duct lengths and add the resulting value to the AAO length field 112.

The apparatus 800 can then determine the quantity of mounting kits recommended for mounting the length of duct determined at block 924 (block 926). The display interface 804 may display the quantity of mounting kits in the suggested quantity of cable kits field 134 (FIG. 1).

The length determiner 812 determines the remaining air duct length required to reach the user-input total air duct length in the total length field 116 (block 928). For example, the length determiner 812 may subtract the duct length sum determined at block 924 from the total duct length specified in the total length field 116. The display interface 804 may display the remaining required air duct length in the remaining length field 132 (FIG. 1).

If the remaining required air duct length is not equal to zero (or substantially equal to zero) (block 930), control returns to block 920, and the remaining required air duct length can be decreased by a change in the user-input total air duct length of the total length field 116 or a change in the duct length sum determined at block 924. If, instead, the remaining required air duct length is equal to zero (or substantially equal to zero) (block 930), control advances to block 932 (FIG. 9B) at which the display interface 804 displays the customizable AAO configuration user interface 600 as discussed above in connection with FIG. 6 to enable user selection of airflow outputs for the airflow output size-adjustable orifices (e.g., the size-adjustable airflow output orifices 212 of FIG. 2) (block 932).

The user input interface 802 retrieves the user-selected airflow output values from the orifice airflow matrix 602 of the customizable AAO configuration user interface 600 for the airflow output size-adjustable orifices (block 934). The airflow determiner 814 determines the sum of airflow output per active duct section (e.g., for each of the AAO sections 208*a-b* of FIG. 2) (block 936) as discussed above in connection with the active duct section airflow sum field 606 of FIG. 6. The display interface 804 may display the sum of airflow output per active duct section in the active duct section airflow sum field 606.

If the sum of airflow output per active duct section should be re-calculated (block 938), control returns to block 934. For example, the sum of airflow output per active duct section may need to be re-calculated if a user makes any change to the user-selected airflow output values in the orifice airflow matrix 602. A user may make changes to the user-selected airflow output values in the orifice airflow matrix 602 if the sum of airflow output per active duct section in the active duct section airflow sum field 606 is not equal to or substantially equal to the value in the airflow output per AAO field 114. Otherwise, if the sum of airflow output per active duct section should not be re-calculated (block 938), a visual depiction of the air duct system 200 is then generated and displayed in the duct view user interface 1300 of FIG. 13 (block 940). For example, the duct system constructor 816 may generate the visual depiction of the air duct system 200 based on parameter values in the duct design user interface 100 of FIG. 1, the pre-defined AAO configuration user interface 500 of FIG. 5, and/or the customizable AAO configuration user interface 600 of FIG. 6, and the display interface 804 may display the visual depiction in the air duct viewer user interface 1300. The example program of FIGS. 9A and 9B then ends.

Figure 10:
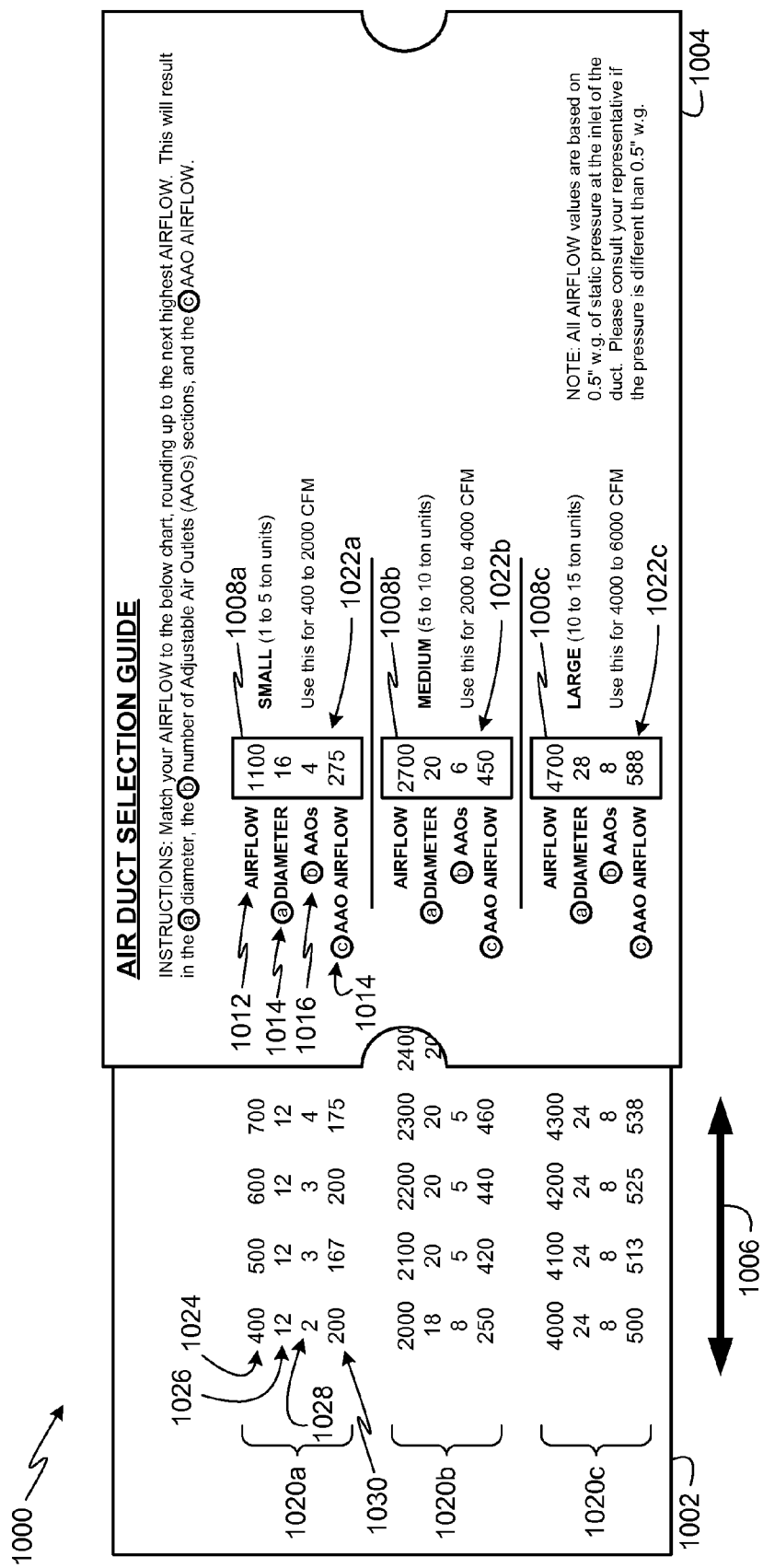
FIG. 10 is an example slide-chart air duct selection tool that may be used to determine quantities of active duct sections for air duct systems.

FIG. 10 is an example slide-chart air duct selection tool 1000 that may be used to determine quantities of active duct sections (e.g., the AAO sections 208*a-b* of FIG. 2) for air duct systems such as the air duct system 200 of FIG. 2. In the illustrated example, the slide-chart air duct selection tool 1000 is formed of an inner slide card 1002 (e.g., a data card) and an outer sleeve template 1004 that receives the inner slide card 1002. The inner slide card 1002 is slideable through the outer sleeve template 1004 in directions generally indicated by arrow 1006.

As shown, the outer sleeve template 1004 is provided with apertures 1008*a-c* (or windows) formed therein to allow viewing portions of the inner slide card 1002. The aperture 1008*a* corresponds to airflow output using small-sized size-adjustable orifices of active duct sections (e.g., the size-adjustable airflow output orifices 212 of the AAO sections 208*a-c* of FIG. 2 when adjusted to a small-sized opening). The aperture 1008*b* corresponds to airflow output using medium-sized size-adjustable orifices of active duct sections (e.g., the size-adjustable airflow output orifices 212 of the AAO sections 208*a-c* of FIG. 2 when adjusted to a medium-sized opening). The aperture 1008*c* corresponds to airflow output using large-sized size-adjustable orifices of active duct sections (e.g., the size-adjustable airflow output orifices 212 of the AAO sections 208*a-c* of FIG. 2 when adjusted to a large-sized opening). Although three apertures 1008*a-c* are shown, the outer sleeve template 1004 may be provided with fewer (e.g., one) or more apertures. For example, the slide-chart air duct selection tool 1000 may be used to select quantities of active duct sections associated with only one of the small, medium, or large-sized size-adjustable orifices.

The outer sleeve template 1004 has a group of indicia located adjacent to each of the apertures 1008*a-c*. A group of indicia located adjacent to the aperture 1008*a* includes an airflow indicium 1012, a duct diameter indicium 1014, a quantity of active duct sections indicium 1016, and an active duct section airflow indicium 1018. The same indicia are also located adjacent to the apertures 1008*b-c*. The airflow indicium refers to a total airflow ($AIRFLOW_{TOT}$) through an air duct system (e.g., the air duct system 200 of FIG. 2). The duct diameter indicium 1014 refers to a diameter of active duct sections (e.g., the AAO sections 208*a-b* of FIG. 2). The quantity of active duct sections indicium 1016 refers to quantities of active duct sections suggested for use in constructing an air duct system. The active duct section airflow indicium 1018 refers to an amount of airflow output by each active duct section indicated by the quantity of active duct sections indicium 1016.

The inner slide card 1002 is provided with groups of data sets 1020*a-c* located thereon. Each data set group 1020*a-c* is arranged in a respective row aligned with a respective one of the apertures 1008*a-c* of the outer sleeve template 1004. In the illustrated example, each data set group 1020*a-c* includes respective data sets that separately show through respective ones of the apertures 1008*a-c* as the inner slide card 1002 slides relative to the outer template sleeve 1004 and different ones of the data sets align with the apertures 1008*a-c*. For example, three data sets 1022*a-c* are shown as aligned with and showing through the apertures 1008*a-c*. Each of the data sets 1022*a-c* includes an airflow rate value 1024, a duct diameter value 1026, an active duct sections quantity value 1028, and an active duct section airflow output value 1030.

In the illustrated example, the airflow rate value 1024 aligns with the airflow indicium 1012 to enable a user to select a desired airflow rate ($AIRFLOW_{TOT}$) through an air duct system. The duct diameter value 1026 aligns with the duct diameter indicium 1014 to provide a recommended duct diameter value for use with the user-selected airflow rate ($AIRFLOW_{TOT}$) (e.g., a duct diameter rated to allow flow therethrough of the airflow rate indicated by the airflow rate value 1024). The active duct sections quantity value 1028 aligns with the quantity of active duct sections indicium 1016 to provide a recommended quantity of active duct sections (e.g., the AAO sections 208*a-b* of FIG. 2) for use with the user-selected airflow rate ($AIRFLOW_{TOT}$) and the recommended duct diameter value. The active duct section airflow output value 1030 aligns with the active duct section airflow indicium 1018 to provide an amount of airflow output by each active duct section indicated by the quantity of active duct sections indicium 1016 when used in connection with user-selected airflow rate ($AIRFLOW_{TOT}$). Thus, in operation, a user can slide the inner slide card 1002 relative to the outer template sleeve 1004 until a desired airflow rate ($AIRFLOW_{TOT}$) is aligned with one of the apertures 1008*a-c* to determined the recommended duct diameter (indicated by the duct diameter indicium 1014), the recommended quantity of quantity of active duct sections (e.g., the AAO sections 208*a-b*) (indicated by the quantity of active duct sections indicium 1016), and the amount of airflow output by each active duct section (indicated by the active duct section airflow indicium 1018).

Although the illustrated example of FIG. 10 shows the airflow indicium 1012, the duct diameter indicium 1014, the quantity of active duct sections indicium 1016, and the active duct section airflow indicium 1018 in a particular order, such indicia may alternatively be placed in different orders (so long as their respective values on the inner slide card 1002 are also rearranged to be in the same order. In addition, in some example implementations some of the indicia 1012, 1014, 1016, and 1018 may be omitted. For example, the active duct section airflow indicium 1018 (and its counter-part values from the inner slide card 1002) may be omitted.

Figure 11:
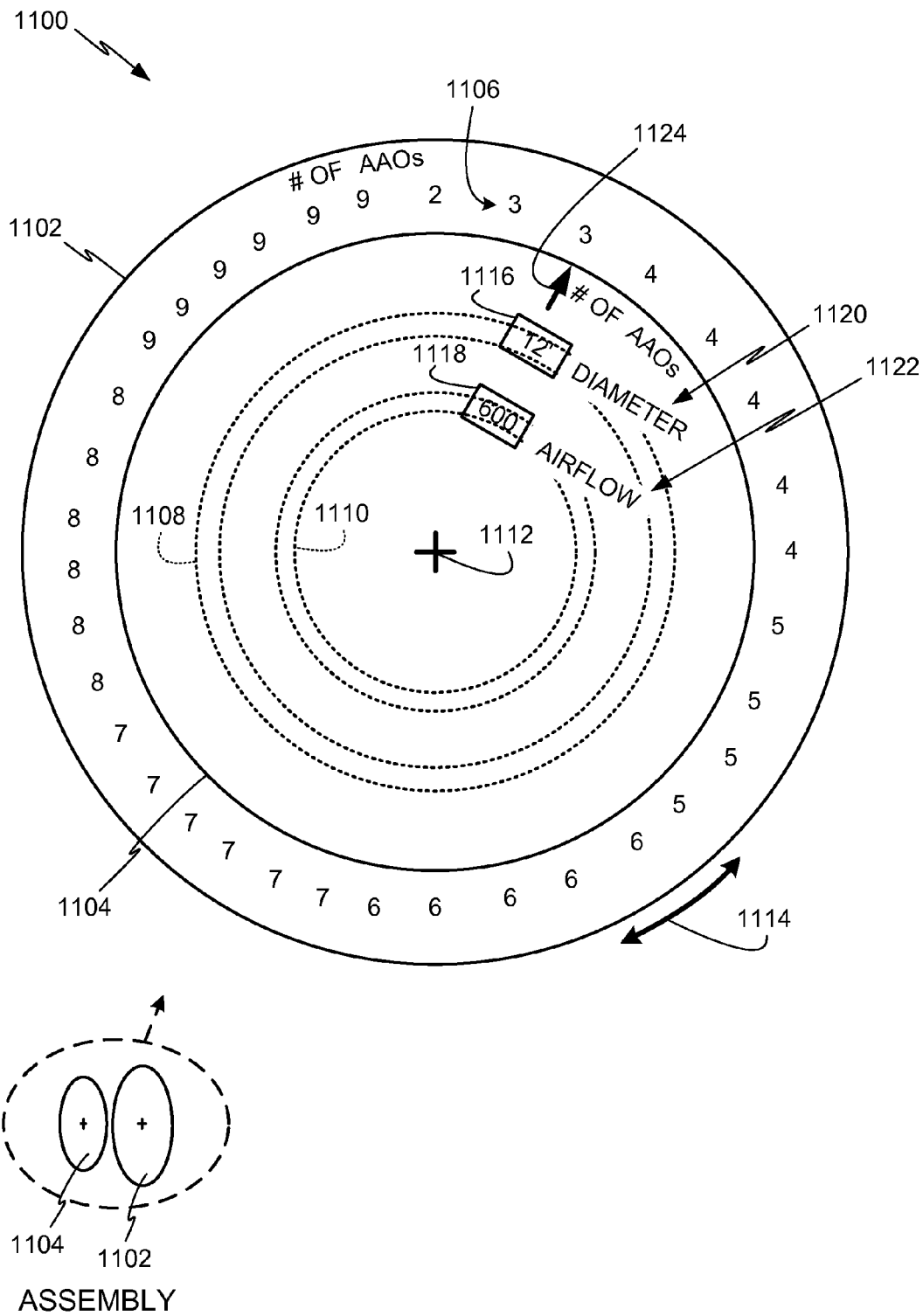
FIG. 11 is an example rotatable disc-based air duct selection tool that may be used to determine quantities of active duct sections for air duct systems.

FIG. 11 is another example air duct selection tool 1100 that may be used to determine quantities of active duct sections (e.g., the AAO sections 208*a-b* of FIG. 2) for air duct systems such as the air duct system 200 of FIG. 2. The air duct selection tool 1100 includes a data disc 1102 (e.g., a data card) and a template disc 1104 overlaid onto the data disc 1102. In the illustrated example, the data disc 1102 includes data values for air duct selection parameters, and the template disc 1104 includes apertures or windows that allow the display of correspondingly aligned ones of the air duct selection parameter values from the data disc 1102. For example, the data disc 1102 is provided with an outer annular data arrangement 1106 showing # of AAO values, an annular data arrangement 1108 showing diameter values, and an inner annular data arrangement 1110 showing airflow rate values. Each of the # of AAO values of the outer annular data arrangement 1106 is in radial alignment with a respective one of the diameter values from the annular data arrangement 1108 and a respective one of the airflow rate values from the inner annular data arrangement 1110 to form data sets of suggested air duct selection parameter values for a desired airflow rate.

The template disc 1104 is rotatably attached to the data disc 1102 to rotate relative to the data disc 1102 about a central point of rotation 1112 along directions generally indicated by arrow 1114. In addition, the template disc 1104 is provided with two apertures or windows 1116 and 1118. A diameter indicium 1120 is located on the template disc 1104 adjacent to the aperture 1116 and an airflow indicium 1122 is located on the template disc 1104 adjacent to the aperture 1118. The aperture 1116 allows viewing the diameter values of the annular data arrangement 1108, and the aperture 1118 allows viewing the airflow rate values of the inner annular data arrangement 1110. In addition, the template disc 1104 is provided with a quantity of active duct selections indicium implemented as an arrow indicator 1124 that points to the # of AAO values of the outer annular data arrangement 1106. In other example implementations, instead of the arrow indicator 1124, the size of the template disc 1104 may be increased to the same size of the data disc 1102 and another window or aperture may be provided to the template disc 1104 corresponding to the outer annular data arrangement 1106 to allow viewing suggested ones of the # of AAOs values for corresponding ones of the diameter values and airflow rate values. Also in other example implementations, the data disc 1102 and the template disc 1104 may be configured to show other air duct selection parameter values (e.g., an AAO airflow value such as the active duct section airflow output value 1030 of FIG. 10) using, for example, another annular data arrangement on the data disc 1102 and another aperture or window on the template disc 1104.

To use the air duct selection tool 1100, a user can rotate the data disc 1102 relative to the template disc 1104 until a desired airflow rate value is viewable through the aperture 1118. In this manner, when the desired airflow rate value is viewable through the aperture 1118, a suggested air duct diameter value is viewable through the aperture 1116 and the arrow indicator 1124 points to a suggested quantity of active air ducts of the outer annular data arrangement 1106. A user can then obtain the indicated quantity of active air ducts of the suggested diameter size to construct an air duct system to handle the desired airflow rate.

Figure 12:
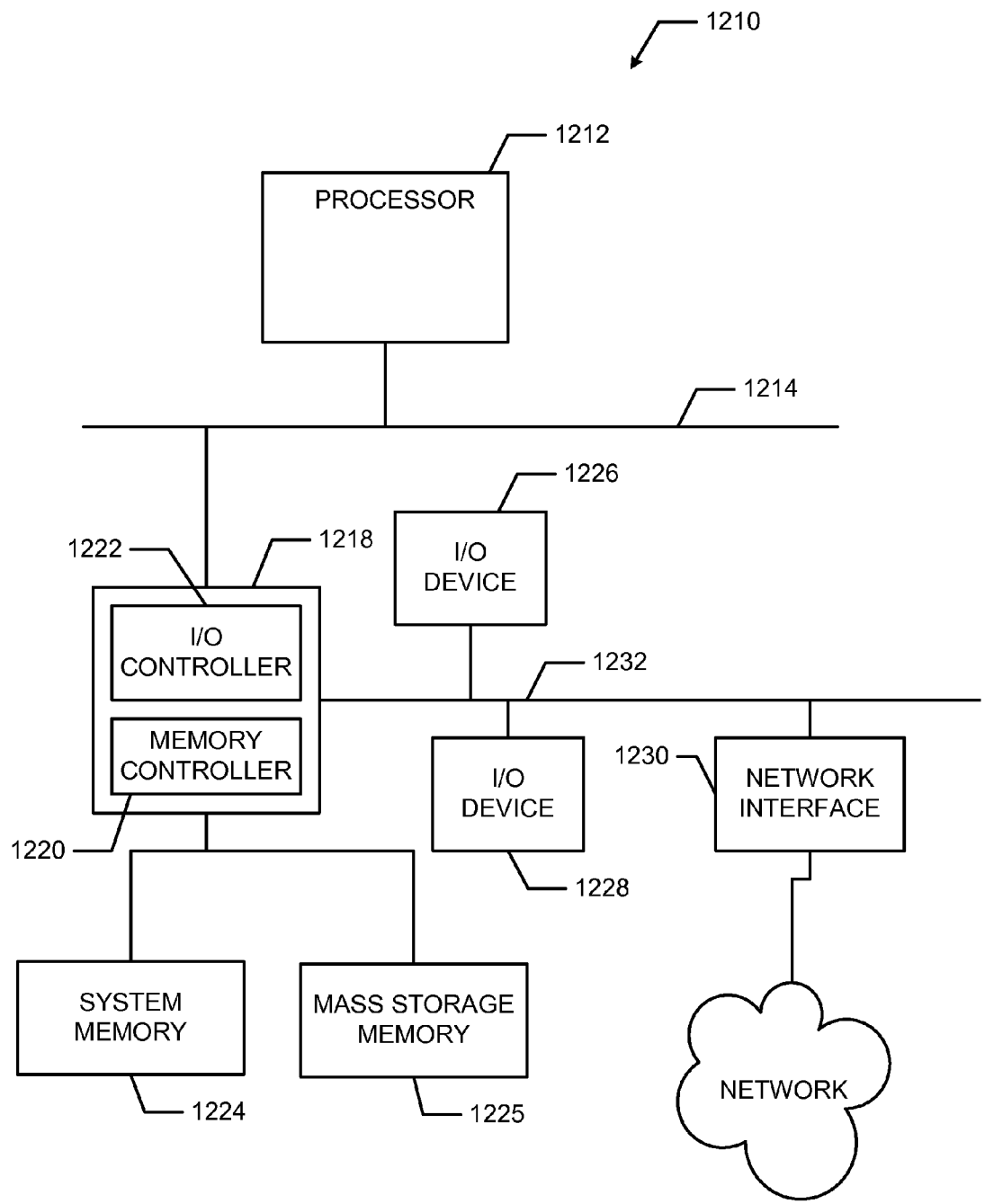
FIG. 12 is a block diagram of an example computer capable of executing the instructions of FIGS. 9A and 9B to implement the example apparatus of FIG. 8.

FIG. 12 is a block diagram of an example processor system 1210 that may be used to execute the instructions of FIGS. 9A and 9B to implement the apparatus 800 of FIG. 8. The processor system 1210 may be, for example, a server, a personal computer, a mobile phone (e.g., a cell phone), a personal digital assistant (PDA), an Internet appliance, or any other type of computing device.

As shown in FIG. 12, the processor system 1210 includes a processor 1212 that is coupled to an interconnection bus 1214. The processor 1212 may be any suitable processor, processing unit or microprocessor. Although not shown in FIG. 12, the system 1210 may be a multi-processor system and, thus, may include one or more additional processors that are identical or similar to the processor 1212 and that are communicatively coupled to the interconnection bus 1214.

The processor 1212 of FIG. 12 is coupled to a chipset 1218, which includes a memory controller 1220 and an input/output (I/O) controller 1222. A chipset typically provides I/O and memory management functions as well as a plurality of general purpose and/or special purpose registers, timers, etc. that are accessible or used by one or more processors coupled to the chipset 1218. The memory controller 1220 performs functions that enable the processor 1212 (or processors if there are multiple processors) to access a system memory 1224 and a mass storage memory 1225. The system memory 1224 may include any desired type of volatile and/or non-volatile memory such as, for example, static random access memory (SRAM), dynamic random access memory (DRAM), flash memory, read-only memory (ROM), etc. The mass storage memory 1225 may include any desired type of mass storage device including hard disk drives, optical drives, tape storage devices, etc. The instructions of FIGS. 9A and 9B may be stored in the system memory 1224, the mass storage memory 1225, and/or on a removable storage medium such as a CD or DVD.

The I/O controller 1222 performs functions that enable the processor 1212 to communicate with peripheral input/output (I/O) devices 1226 and 1228 and a network interface 1230 via an I/O bus 1232. The I/O devices 1226 and 1228 may be any desired type of I/O device such as, for example, a keyboard, a video display or monitor, a mouse, etc. The network interface 1230 may be, for example, an Ethernet device, an asynchronous transfer mode (ATM) device, an 802.11 device, a DSL modem, a cable modem, a cellular modem, etc. that enables the processor system 1210 to communicate with another processor system.

While the memory controller 1220 and the I/O controller 1222 are depicted in FIG. 12 as separate blocks within the chipset 1218, the functions performed by these blocks may be integrated within a single semiconductor circuit or may be implemented using two or more separate integrated circuits. The system of FIG. 12 may represent, for example, a server executing the instructions of FIGS. 9A and 9B in response to HTTP requests received over the Internet. The server may serve one or more webpages to requesting clients in order to solicit the design parameters, display air duct design suggestions and/or receive user selections of one or more of the suggested designs. Additionally, the server may receive payment information and/or authorization from a user and/or interact with a third party payment server to process payments associated with orders for air ducts.

Figure 15:
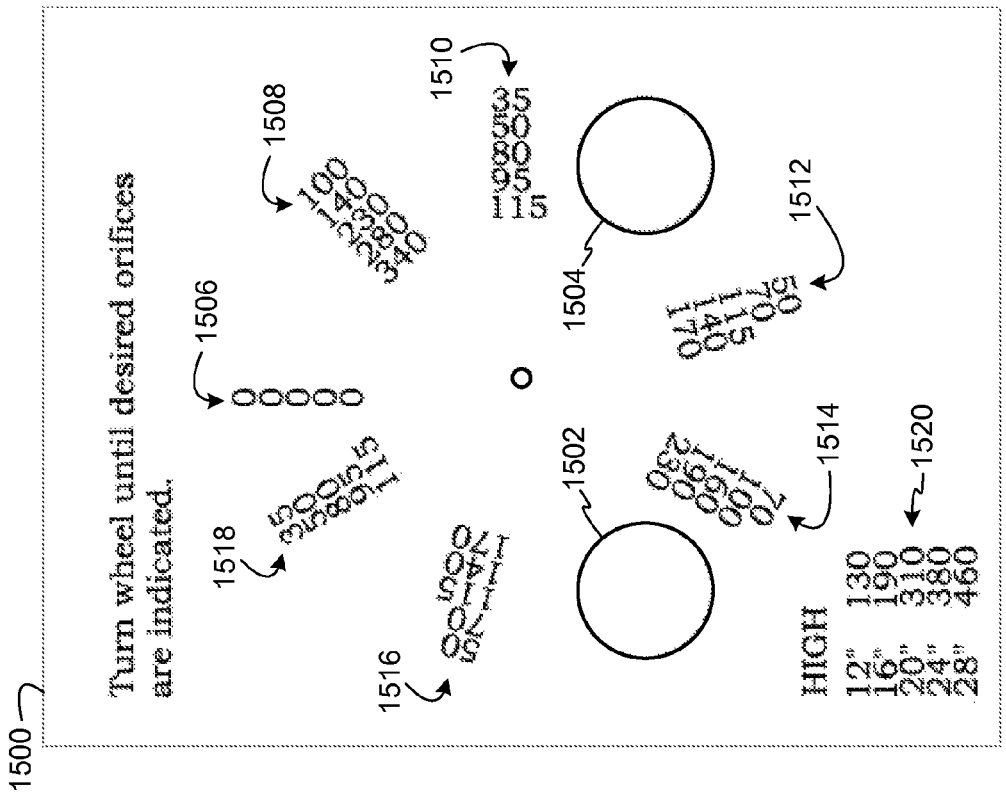
FIG. 14 depicts a rotatable disc and FIG. 15 depicts a backing of an example dial-based air duct configuration tool that may be used to determine sizes of size-adjustable airflow output orifices for active duct sections and corresponding airflow output values.
Figure 14:
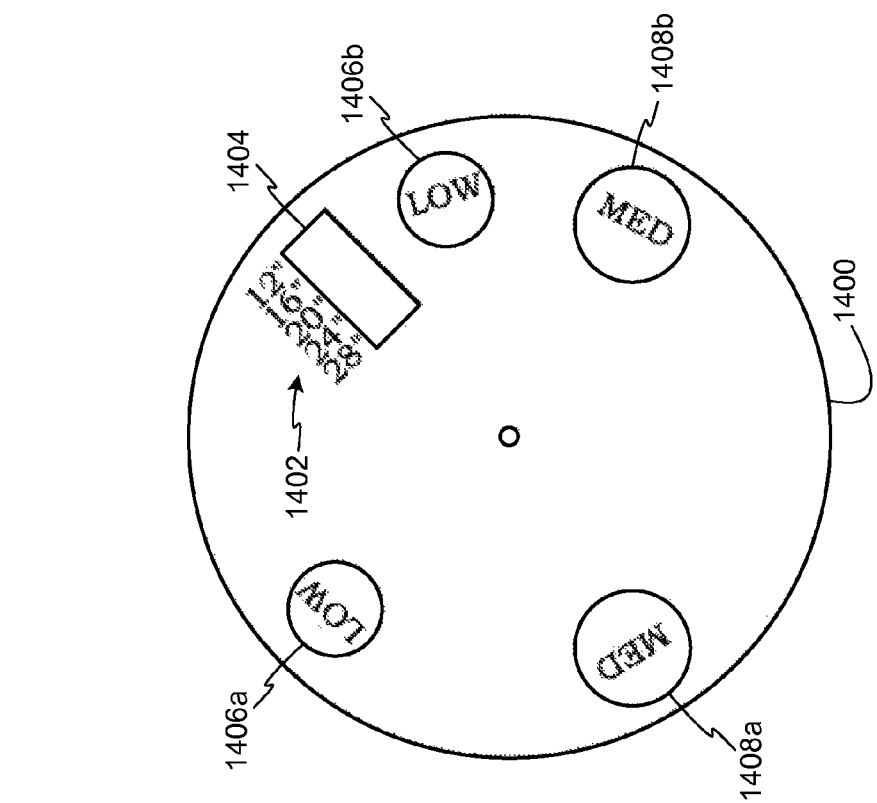

FIG. 14 depicts a rotatable disc 1400 and FIG. 15 depicts a backing 1500 of an example dial-based air duct configuration tool 1600 (FIGS. 16-23) that may be used to determine sizes of size-adjustable airflow output orifices (e.g., the size-adjustable airflow output orifices 212 of FIG. 2) for active duct sections (e.g., the AAO sections 208*a-b* of FIG. 2) and corresponding airflow output values. In the illustrated example, the rotatable disc 1400 is formed of a transparent material (e.g., a cellophane material) to enable viewing indicia printed on the backing 1500 when the rotatable disc 1400 is assembled in an overlaying configuration onto the backing 1500. In the illustrated example, the rotatable disc 1400 is provided with duct diameter indicia 1402 adjacent an airflow rate readout window 1404. The duct diameter indicia 1402 include different diameter sizes of active duct sections. The rotatable disc 1400 is also provided with LOW airflow indicators 1406*a-b* and MED airflow indicators 1408*a-b*. The LOW airflow indicators 1406*a-b* correspond to the smallest size (without closing) to which corresponding size-adjustable airflow output orifices (e.g., the size-adjustable airflow output orifices 212 of FIG. 2) can be set. The MED airflow indicators 1408*a-b* correspond to a medium size to which corresponding size-adjustable airflow output orifices (e.g., the size-adjustable airflow output orifices 212 of FIG. 2) can be set.

In the illustrated example of FIG. 15, the backing 1500 is provided with a left size-adjustable airflow output orifice target 1502 and a right size-adjustable airflow output orifice target 1504. The left size-adjustable airflow output orifice target 1502 corresponds to a left-side size-adjustable airflow output orifice of an active duct section (e.g., a left-sided one of the size-adjustable airflow output orifices 212 of FIG. 2). The right size-adjustable airflow output orifice target 1504 corresponds to a right-side size-adjustable airflow output orifice of an active duct section (e.g., a right-sided one of the size-adjustable airflow output orifices 212 of FIG. 2).

In the illustrated example of FIG. 15, the backing 1500 is also provided with groups or sets of airflow output rate values printed thereon, each airflow output rate value of each set corresponding to a different air duct diameter (e.g., the air duct diameters specified by the duct diameter indicia 1402 of FIG. 14). In particular, the backing 1500 includes an OFF-configuration airflow output set 1506, a MED-MED-configuration airflow output set 1508, an OFF-LOW-configuration airflow output set 1510, a MED-OFF airflow output set 1512, a LOW-LOW-configuration airflow output set 1514, an OFF-MED airflow output set 1516, and a LOW-OFF airflow output set 1518.

Each of the airflow output sets 1506, 1508, 1510, 1512, 1514, 1516, and 1518 is arranged at respective locations on the backing 1500 so that it shows through or aligns with the airflow rate readout window 1404 of FIG. 14 when a corresponding combination of the LOW airflow indicators 1406a-b, the MED airflow indicators 1408a-b, and/or closed orifice positions align with the left size-adjustable airflow output orifice target 1502 and the right size-adjustable airflow output orifice target 1504 as shown in FIGS. 16-22. For example, as shown in FIG. 16, when a MED-MED size-adjustable airflow output orifice configuration is selected by aligning the MED airflow indicators 1408a-b with respective ones of the left and right size-adjustable airflow output orifice targets 1502 and 1504, the MED-MED-configuration airflow output set 1508 is aligned with the airflow rate readout window 1404. In this manner, a user can identify a total airflow output value for the sized orifices (or a sized orifice and a closed orifice) corresponding to a particular air duct diameter indicated by the duct diameter indicia 1402. In the illustrated example, for the MED-MED-configuration airflow output set 1508, a 12" diameter duct produces a 100 CFM airflow output rate, a 16" diameter duct produces a 140 CFM airflow output rate, a 20" diameter duct produces a 230 CFM airflow output rate, a 24" diameter duct produces a 280 CFM airflow output rate, and a 28" diameter duct produces a 340 CFM airflow output rate.

As shown in the illustrated example of FIG. 17, a MED-OFF-configuration can be selected by rotating the rotatable disc 1400 relative to the backing 1500 until the MED airflow indicators 1408b aligns with the left size-adjustable airflow output orifice target 1502 and none of the airflow indicators 1406a-b and 1408a-b align with the right size-adjustable airflow output orifice target 1504 indicating that a right size-adjustable airflow output orifice of an active duct section is closed.

Other size-adjustable airflow output orifice configurations are shown in FIGS. 18-22. In particular, FIG. 18 shows an OFF-MED-configuration, FIG. 19 shows an OFF-OFF-configuration, FIG. 20 shows a LOW-LOW-configuration, FIG. 21 shows a LOW-OFF-configuration, and FIG. 22 shows an OFF-LOW-configuration.

Returning to the illustrated example of FIG. 15, the backing 1500 is provided with a HIGH airflow output section 1520 printed thereon showing different airflow output rates from size-adjustable airflow output orifices (e.g., the size-adjustable airflow output orifices 212 of FIG. 2) set to a largest-size opening. In the illustrated example, the airflow output rates shown in the HIGH airflow output section 1520 correspond to different duct diameters for a HIGH-HIGH-configuration in which both size-adjustable airflow output orifices (e.g., the size-adjustable airflow output orifices 212 of FIG. 2) are set to the largest-size opening.

In other example implementations, instead of providing the HIGH airflow output section 1520 on the backing 1500, HIGH airflow indicators (e.g., similar to the airflow indicators 1406a-b and 1408a-b of FIG. 14) may instead be printed on the rotatable disc 1400 and corresponding airflow output rate values may be printed on the backing 1500. In such implementations, the HIGH airflow indicators can be selected in the same manner as the LOW and MED airflow indicators 1406a-b and 1408a-b by rotating the rotatable disc 1400 relative to the backing 1500 until one or both of the HIGH airflow indicators aligns with ones of the left and right size-adjustable airflow output orifice targets 1502 and 1504 and a corresponding airflow output set aligns with the airflow rate readout window 1404.

Turning to FIG. 23, a rear surface 2302 of the backing 1500 of FIG. 15 is shown as having a static pressure graph 2304 printed thereon to facilitate determining airflow output values for different static pressure conditions. The static pressure graph 2304 shows a static pressure curve 2306 plotted against static pressure values axis 2308 and a multiplying factors axis 2310. In the illustrated example, a user can use the static pressure graph 2304 to determine airflow rates needed to produce different static pressures based on the airflow output values in the airflow output sets 1506, 1508, 1510, 1512, 1514, 1516, and 1518. In particular, for a certain amount of static pressure, a user can multiply an airflow output value shown in the airflow rate readout window 1404 by a multiplying factor along the multiplying factors axis 2310 corresponding to the desired static pressure in the static pressure values axis 2308.

Figure 24:
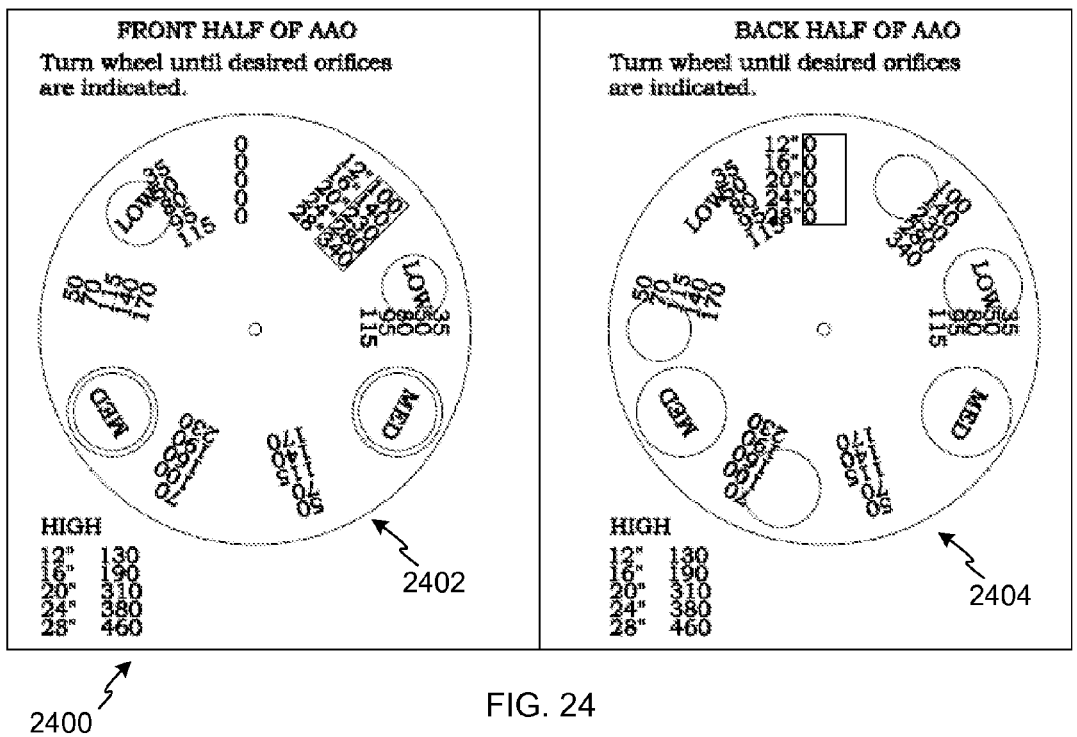
FIG. 24 depicts an example dual-dial air duct configuration tool that may be used to determine sizes of adjustable air outlets for front and back halves of active duct sections.

FIG. 24 depicts an example dual-dial air duct configuration tool 2400 that may be used to determine sizes of adjustable air outlets for front and back halves of active duct sections (e.g., the AAO sections 208a-b of FIG. 2). In the illustrated example, the dual-dial air duct configuration tool 2400 is provided with a front-half dial-based air duct configurator 2402 and a back-half dial-based air duct configurator 2404. Each of the configurators 2402 and 2404 is substantially similar or identical to the example dial-based air duct configuration tool 1600 of FIGS. 16-22. While the dial-based air duct configuration tool 1600 represents only one half of an active duct section (e.g., a front half or a back half), the dual-dial air duct configuration tool 2400 represents a front half and a back half of an active duct section. In particular, the front-half dial-based air duct configurator 2402 may be used to determine airflow output values for two size-adjustable airflow output orifices (e.g., the size-adjustable airflow output orifices 212 of FIG. 2) of a front half of an active duct section and the back-half dial-based air duct configurator 2404 may be used to determine airflow output values for two size-adjustable airflow output orifices of a back half of the active duct section. In this manner, the dual-dial air duct configuration tool 2400 may be used to configure the size-adjustable airflow output orifices of one entire active duct section having front-half and back-half orifices.

Figure 25:
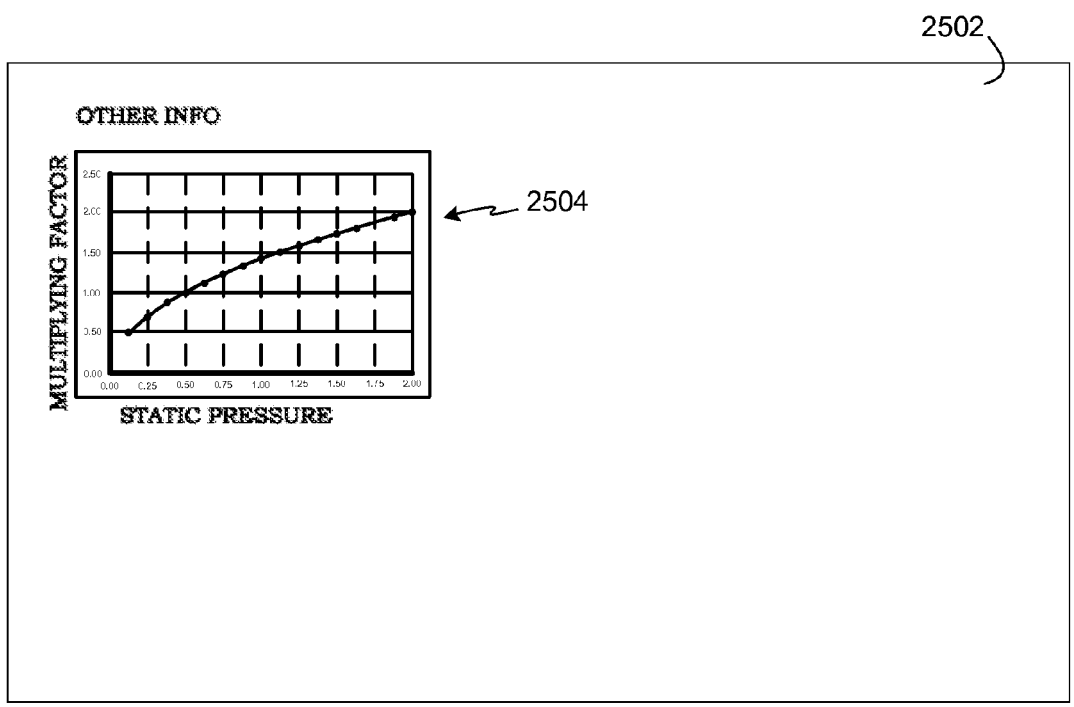
FIG. 25 depicts a back side of the example dual-dial air duct configuration tool of FIG. 24 including static pressure information to facilitate configuring adjustable air outlets for active duct sections.

As shown in FIG. 25, a rear surface 2502 of the dual-dial air duct configuration tool 2400 includes a static pressure graph 2504 printed thereon to facilitate determining airflow output values for different static pressure conditions. The static pressure graph 2504 is substantially similar or identical to the static pressure graph 2304 of FIG. 23.

The operation of each of the dial-based air duct configurator 2402 and 2404 is substantially similar or identical to the operation of the dial-based air duct configuration tool 1600 of FIGS. 16-22 as described above, and the manner of using the static pressure graph 2504 is substantially similar or identical to the manner of using the static pressure graph 2304 as described above. Accordingly, for purposes of brevity, the methods for operating the dual-dial air duct configuration tool 2400 and the manner of using the static pressure graph 2504 will not be repeated, but instead, the interested reader is referred to the above descriptions of FIGS. 14-23.

Figure 26:
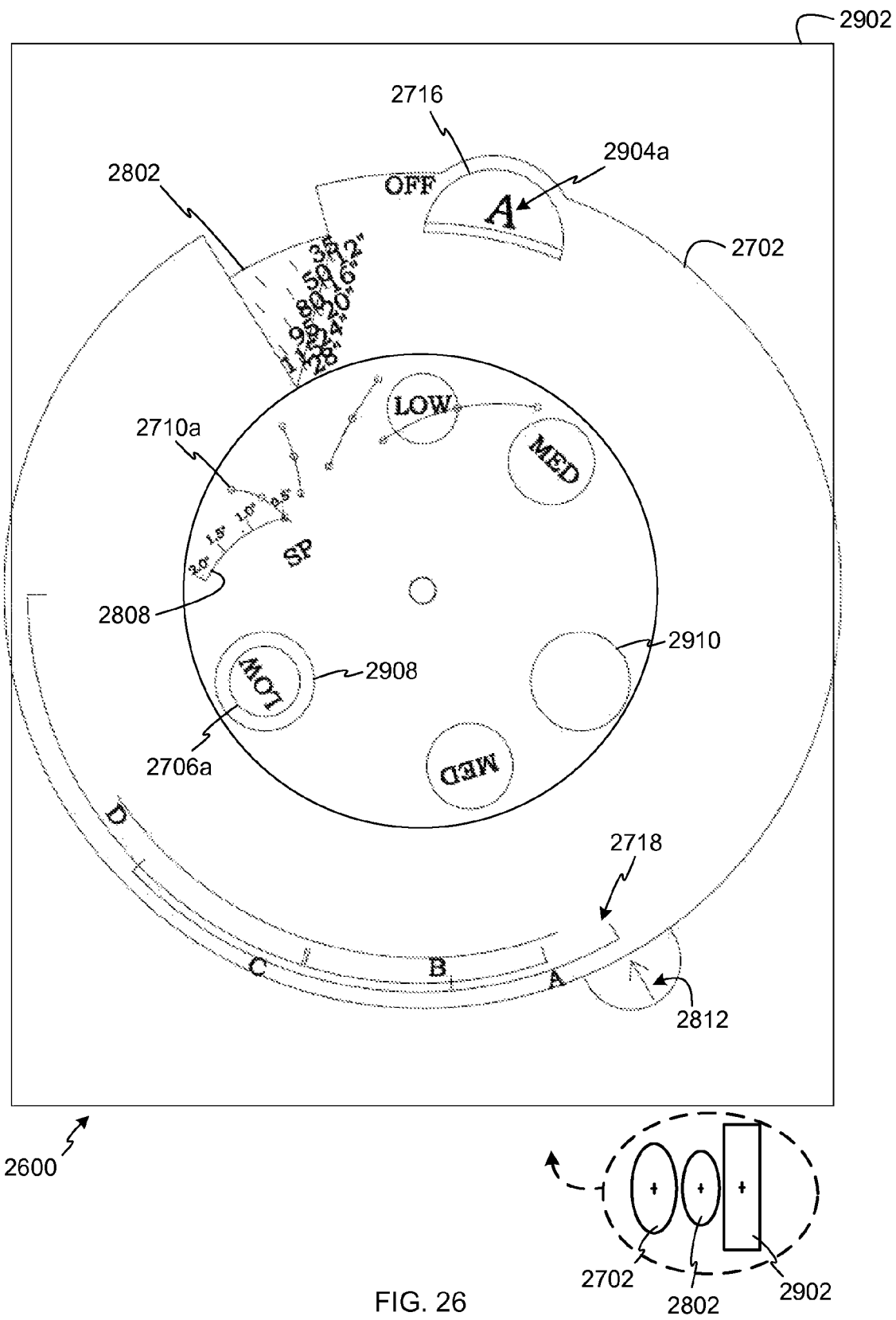
FIG. 26 depicts another example dial-based air duct configuration tool that may be used to determine sizes of size-adjustable airflow output orifices for active duct sections and corresponding airflow output values.
Figure 29:
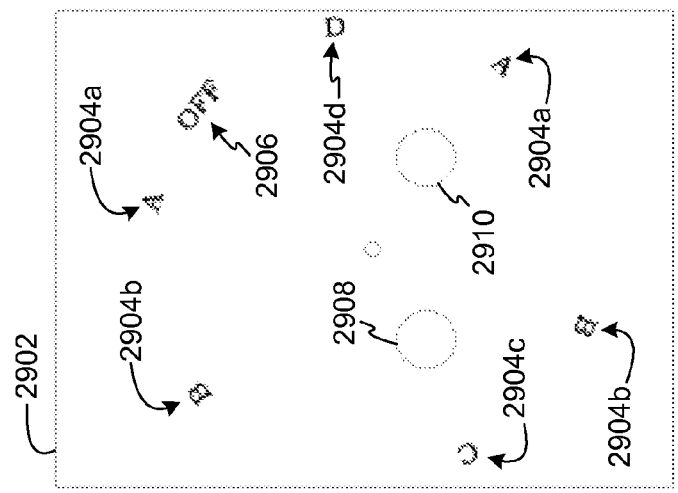
FIG. 29 depicts a backing of the example dial-based air duct configuration tool of FIG. 26.
Figure 28:
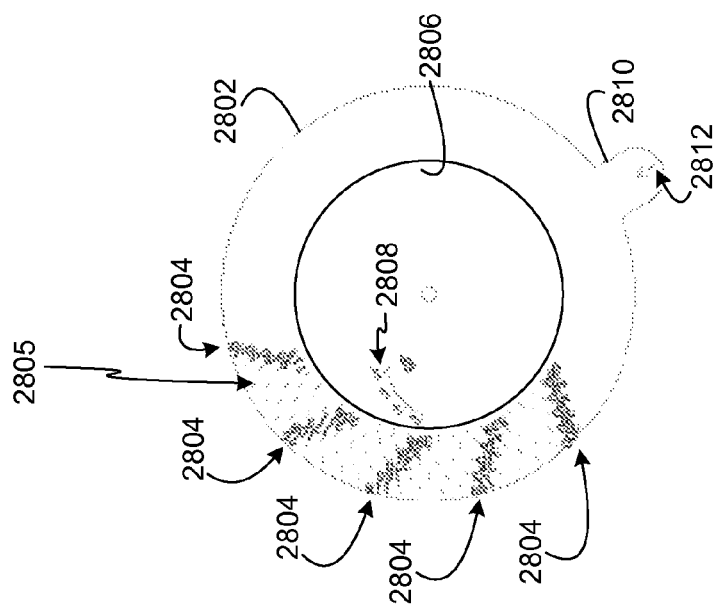
FIG. 28 depicts a back rotatable disc of the example dial-based air duct configuration tool of FIG. 26.
Figure 27:
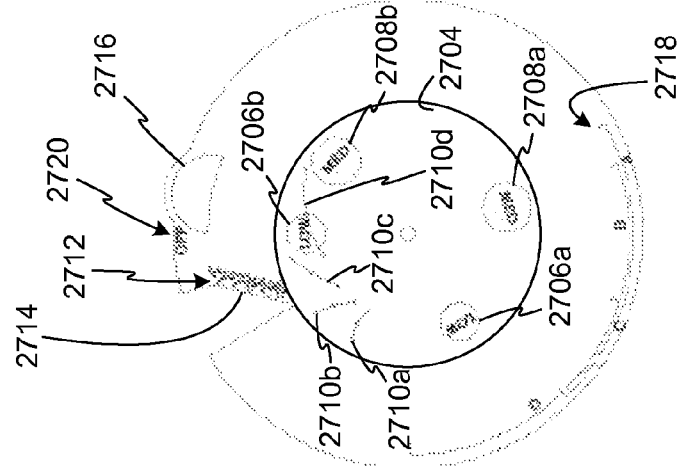
FIG. 27 depicts a front rotatable disc of the example dial-based air duct configuration tool of FIG. 26.

FIG. 26 depicts another example dial-based air duct configuration tool 2600 that may be used to determine sizes of size-adjustable airflow output orifices (e.g., the size-adjustable airflow output orifices 212 of FIG. 2) for active duct sections (e.g., the AAO sections 208a-b of FIG. 2) and corresponding airflow output values. In the illustrated example, the dial-based air duct configuration tool 2600 can be used to configure two size-adjustable orifices of an active duct section. The dial-based air duct configuration tool 2600 is formed using three layers shown in FIGS. 27-29. In particular, FIG. 27 depicts a front rotatable disc 2702 of the example dial-based air duct configuration tool 2600, FIG. 28 depicts a back rotatable disc 2802 of the example dial-based air duct configuration tool 2600, and FIG. 29 depicts a backing 2902 of the example dial-based air duct configuration tool 2600. When assembled as shown in FIG. 26, the front rotatable disc 2702 and the back rotatable disc 2802 rotate relative to one another and relative to the backing 2902 to enable a user to select different orifice size configurations for size-adjustable airflow output orifices (e.g., the size-adjustable airflow output orifices 212 of FIG. 2) and find corresponding total airflow outputs for the different orifice size configurations. In the illustrated example, the dial-based air duct configuration tool 2600 also includes a static pressure component to enable users to fine tune airflow output values to meet specific status pressure requirements.

Referring to FIG. 27, the front rotatable disc 2702 is provided with a central portion 2704 formed using a transparent material (e.g., a cellophane material) and having LOW airflow indicators 2706*a-b*, MED airflow indicators 2708*a-b*, and static pressure curves 2710*a-d* located thereon. The LOW airflow indicators 2706*a-b* correspond to size-adjustable airflow output orifices set to a small-size opening, and the MED airflow indicators 2708*a-b* correspond to size-adjustable airflow output orifices set to a medium-size opening. In other example implementations, the front rotatable disc 2702 may also be provided with HIGH airflow indicators and the dial-based air duct configuration tool 2600 may be configured to provide airflow output values for orifice-size configurations involving HIGH airflow configuration settings.

In the illustrated example, each of the static pressure curves 2710*a-d* corresponds to different airflow output ranges that may be produced using different configuration of orifice sizes (e.g., medium, small, and closed) for size-adjustable airflow output orifices of an active duct section (e.g., the size-adjustable airflow output orifices 212 of the AAO sections 208*a-b* of FIG. 2).

The front rotatable disc 2702 is also provided with duct diameter indicia 2712 adjacent an airflow rate readout guide 2714. The duct diameter indicia 2712 include different diameter sizes of active duct sections. The front rotatable disc 2702 is also provided with an airflow output range window 2716 and airflow output ranges 2718. In addition, the front rotatable disc 2702 is provided with an OFF configuration indicator 2720. In the illustrated example, the airflow output ranges 2718 include four ranges indicated by letter designators A, B, C, D.

In the illustrated example, each of the airflow output ranges 2718 and corresponding letter designators A, B, C, D are color coded using a respective color. Each of the static pressure curves 2710*a-d* corresponds to a different airflow output range and, thus, to a different one of the airflow output ranges 2718 and corresponding letter designators A, B, C, D. To show the correspondence between each static pressure curve 2710*a-d* and each respective airflow output range 2718, each static pressure curve 2710*a-d* is also color coded to match the color of its corresponding airflow output range 2718. In this manner, a user can relatively easily identify, based on color, the static pressure curve that should be used when operating an active air duct within an airflow output range corresponding to one of the airflow output ranges 2718.

Referring to FIG. 28, the back rotatable disc 2802 is provided with groups or sets of airflow output rate values 2804 printed thereon, each set corresponding to a different air duct diameter (e.g., the air duct diameters specified by the duct diameter indicia 2712 of FIG. 27). In the illustrated example, the airflow output sets 2804 are located in staggered arrangements, and tick marks 2805 are located between the airflow output sets 2804. The airflow output sets 2804 and intervening tick marks 2805 form an airflow output scale (in CFM units). The airflow output sets 2804 or the intervening tick marks 2805 align with the airflow rate readout guide 2714 (FIG. 27) of the front rotatable disc 2702 to provide different airflow output values at incremental adjustments of the back rotatable disc 2802. Although the airflow output sets 2804 are shown as having printed numeric values, more airflow output sets with numeric values may be provided between the airflow output sets 2804 or fewer of the airflow output sets 2804 with numeric values may be provided.

In the illustrated example of FIG. 28, the back rotatable disc 2802 is also provided with a central portion 2806 formed using a transparent material (e.g., a cellophane material) and having a static pressure reference curve 2808 printed thereon. In addition, the back rotatable disc 2802 is provided with a tab 2810 with an arrow indicator 2812 printed thereon. The tab 2810 facilitates movement of the back rotatable disc 2802 relative to the front rotatable disc 2702. During use, a user may move the tab 2810 to align the arrow indicator 2812 with different ones of the airflow output ranges 2718. In particular, for each of the different airflow output ranges 2718, the tab 2810 may be adjusted for different static pressures (e.g., 0.5 water gauge static pressure, 1.0 water gauge static pressure, 1.5 water gauge static pressure, 2.0 water gauge static pressure, in the illustrated example), while keeping the arrow indicator 2812 within the boundaries of a desired airflow output range 2718.

Turning to FIG. 29, the backing 2902 is provided with airflow output range indicia 2904*a-d*, noted as letters A, B, C, D, in the illustrated example. Each of the airflow output range indicia 2904*a-d* (A, B, C, D) corresponds to a different airflow output range. As with the color coding of the airflow output ranges 2718 and the static pressure curves 2710*a-d* of FIG. 27, each of the airflow output range indicia 2904*a-d* (A, B, C, D) is also color coded with a respective color to match corresponding ones of the airflow output ranges 2718 and static pressure curves 2710*a-d*.

Different airflow output ranges corresponding to the airflow output range indicia 2904*a-d* (A, B, C, D) may be produced using different configurations of orifice sizes for size-adjustable airflow output orifices of an active duct section (e.g., the size-adjustable airflow output orifices 212 of the AAO sections 208*a-b* of FIG. 2). For example, such configurations may include a MED-MED-configuration, in which two size-adjustable orifices are set to a medium-size opening, a LOW-LOW-configuration, in which two size-adjustable orifices are set to a small-size opening, an OFF-LOW-configuration, in which one size-adjustable orifice is closed and the other size-adjustable orifice is set to a small-size opening, and an OFF-MED-configuration, in which one size-adjustable orifice is closed and the other size-adjustable orifice is set to a medium-size opening. In addition, the backing is provided with an OFF configuration indicia 2906 corresponding to a configuration in which both size-adjustable orifices represented by the dial-based air duct configuration tool 2600 are closed (i.e., zero airflow output).

In the illustrated example, the backing 2902 is also provided with a left size-adjustable airflow output orifice target 2908 and a right size-adjustable airflow output orifice target

2910. The left size-adjustable airflow output orifice target 2908 corresponds to a left-side size-adjustable airflow output orifice of an active duct section (e.g., a left-sided one of the size-adjustable airflow output orifices 212 of FIG. 2). The right size-adjustable airflow output orifice target 2910 corresponds to a right-side size-adjustable airflow output orifice of an active duct section (e.g., a right-sided one of the size-adjustable airflow output orifices 212 of FIG. 2).

When the front rotatable disc 2702, the back rotatable disc 2802, and the backing 2902 are assembled to form the dial-based air duct configuration tool 2600 as shown in FIG. 26, the transparent central portion 2704 of the front rotatable disc 2702 and the transparent central portion 2806 of the back rotatable disc 2802 enable viewing the left and right size-adjustable airflow output orifice targets 2908 and 2910 of the backing 2902 through the back rotatable disc 2802 and the front rotatable disc 2702. In this manner, different combinations of the LOW airflow indicators 2706*a-b* and MED airflow indicators 2708*a-b* of the front rotatable disc 2702 can be aligned with the left and right size-adjustable airflow output orifice targets 2908 and 2910 of the backing 2902. In addition, the transparent central portion 2704 of the front rotatable disc 2702 enables viewing the static pressure reference curve 2808 of the back rotatable disc 2802 through the front rotatable disc 2702 to enable aligning the static pressure reference curve 2808 of the back rotatable disc 2802 with different ones of the static pressure curves 2710*a-d* of the front rotatable disc 2702.

Figure 30:
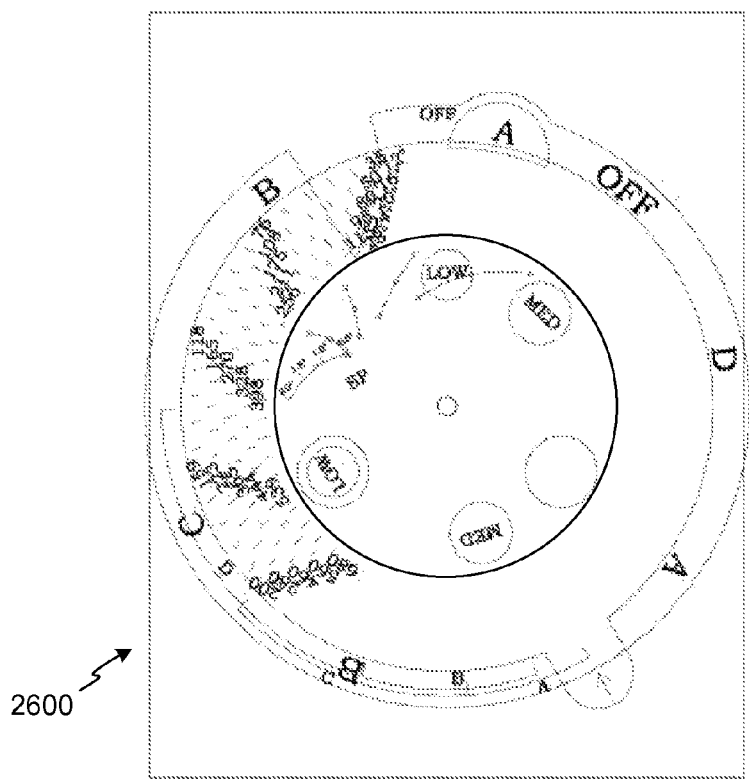
FIG. 30 depicts a fully transparent assembly of the example dial-based air duct configuration tool showing indicia of the front rotatable disc of FIG. 27, the back rotatable disc of FIG. 28, and the backing of FIG. 29 relative to one another when the rotatable discs and the backing are assembled.

FIG. 30 depicts a fully transparent assembly of the example dial-based air duct configuration tool 2600 showing indicia of the front rotatable disc 2702 of FIG. 27, the back rotatable disc 2802 of FIG. 28, and the backing 2902 of FIG. 29 relative to one another when the rotatable discs 2702 and 2802 and the backing 2902 are assembled.

During operation of the example dial-based air duct configuration tool 2600, a user rotates the front rotatable disc 2702 until desired ones of the LOW airflow indicators 2706*a-b* and MED airflow indicators 2708*a-b* align with the left and right size-adjustable airflow output orifice targets 2908 and 2910 in a manner that represents desired settings for two size-adjustable orifices of an active duct section (e.g., the two active duct sections 208*a-b* of FIG. 2). The user then reads the one of the airflow output range indicia 2904*a-d* (A, B, C, D) that appears through the airflow output range window 2716. The user then turns the back rotatable disc 2802 until the arrow indicator 2812 is pointing to one of the airflow output ranges 2718 (A, B, C, D) corresponding to the one of the airflow output range indicia 2904*a-d* (A, B, C, D) that appears through the airflow output range window 2716. In some instances, the user may move the arrow indicator 2812 to the OFF configuration indicator 2720 if the OFF configuration indicia 2906 appears through the airflow output range window 2716.

After moving the arrow indicator 2812 to point to one of the airflow output ranges 2718 (A, B, C, D), and while keeping the arrow indicator 2812 within the selected one of the airflow output ranges 2718 (A, B, C, D), the user may fine tune the dial-based air duct configuration tool 2600 to a particular static pressure by rotating the back rotatable disc 2802 so that one of the static pressure curves 2710*a-d* corresponding to the selected one of the airflow output ranges 2718 (A, B, C, D) aligns with the static pressure reference curve 2808. The user can then set the intersection between the selected one of the static pressure curves 2710*a-d* and the static pressure reference curve 2808 to a desired static pressure value (e.g., 0.5 water gauge static pressure, 1.0 water gauge static pressure, 1.5 water gauge static pressure, 2.0 water gauge static pressure, in the illustrated example) on the static pressure reference curve 2808. After completing the fine tuning based on the static pressure, the user can read an airflow output value for a particular duct diameter based on an airflow output value set (e.g., one of the airflow output sets 2804 or intervening set) that aligns with the airflow rate readout guide 2714.

Referring back to FIG. 26, the dial-based air duct configuration tool 2600 is set to a LOW-OFF configuration by having the LOW airflow indicator 2706*a* aligned with the left size-adjustable airflow output orifice target 2908 and none of the LOW airflow indicators 2706*a-b* and MED airflow indicators 2707*a-b* aligned with the right size-adjustable airflow output orifice target 2910. In this configuration, the airflow output range indicia A 2904*a* shows through the airflow output range window 2716, and the arrow indicator 2812 points to the airflow output range 2718 corresponding to letter designator A. In addition, the back rotatable disc 2802 has been fine tuned or adjusted relative to the front rotatable disc 2702 so that the static pressure curves 2710*a* corresponding to the airflow output range indicia A 2904*a* is aligned with a 0.5 water gauge static pressure value on the static pressure reference curve 2808 of the back rotatable disc 2802. The resulting airflow output readout is indicated by the airflow rate readout guide 2714 based on an airflow output value set (e.g., one of the airflow output sets 2804 or intervening set) that aligns with the airflow rate readout guide 2714.

Figure 31:
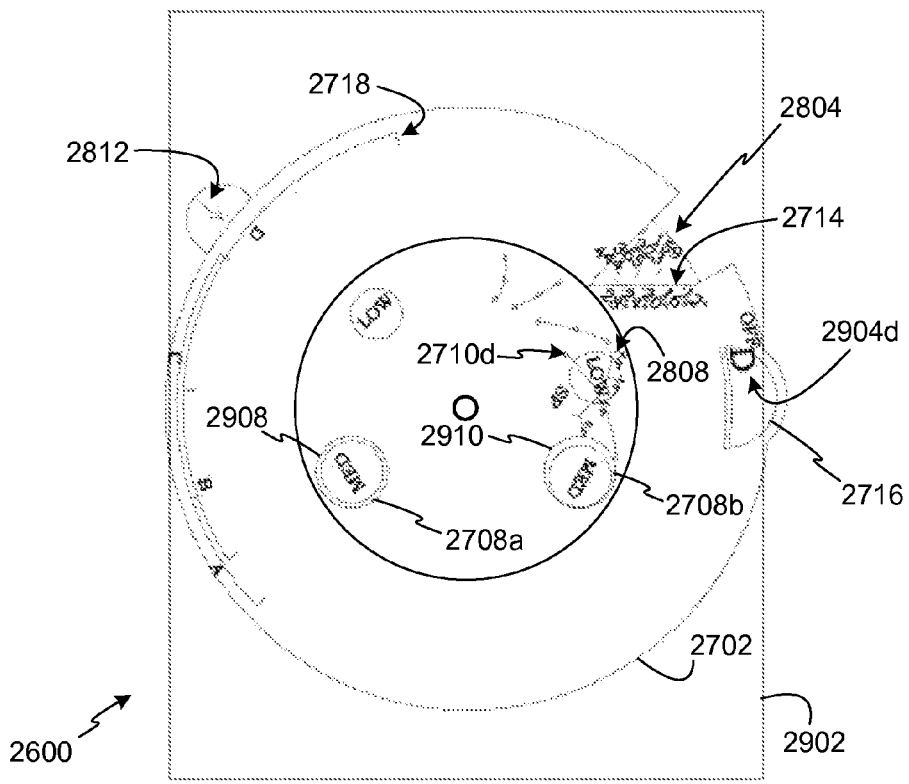
FIG. 31 depicts an example use of the example dial-based air duct configuration tool of FIG. 26.

FIG. 31 depicts an example use of the example dial-based air duct configuration tool 2600 of FIG. 26, in which the tool 2600 is set to a MED-MED configuration by having both of the MED airflow indicators 2708*a-b* aligned with the left and right size-adjustable airflow output orifice targets 2908 and 2910. In this configuration, the airflow output range indicia D 2904*d* shows through the airflow output range window 2716, and the arrow indicator 2812 points to the airflow output range 2718 corresponding to letter designator D. In addition, the back rotatable disc 2802 has been fine tuned or adjusted relative to the front rotatable disc 2702 so the static pressure curve 2710*d* corresponding to the airflow output range indicia D 2904*d* is aligned with a 1.0 water gauge static pressure value on the static pressure reference curve 2808 of the back rotatable disc 2802. The resulting airflow output readout is indicated by the airflow rate readout guide 2714 based on an airflow output value set (e.g., one of the airflow output sets 2804 or intervening set) that aligns with the airflow rate readout guide 2714.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to select active air duct sections to form an air duct system, the method comprising:

determining, via a processor, a first quantity of adjustable air outlet duct sections to configure an air delivery duct system when an operating mode identifier is received, the operating mode identifier associated with an amount of air delivered by the air delivery duct system into targeted areas, the first quantity of adjustable air outlet duct sections being based on an airflow rate value and the operating mode identifier, the airflow rate value being indicative of airflow through an air delivery duct system, and each adjustable air outlet duct section including at least one adjustable air outlet having at least one size-adjustable orifice.

2. A method as defined in claim 1, further comprising determining a custom quantity of adjustable air outlet duct sections to configure the air delivery duct system when the operating mode identifier is not received.

3. A method as defined in claim 2, further comprising determining an airflow output value for the at least one size-adjustable orifice based on the custom quantity of adjustable air outlet duct sections and a duct diameter when the operating mode identifier is not received or based on the operating mode identifier and the duct diameter when the operating mode identifier is received.

4. A method as defined in claim 3, wherein the duct diameter is selected based on the airflow rate value.

5. A method as defined in claim 2, further comprising:
determining a sum of the length of the custom quantity or the first quantity of adjustable air outlet duct sections and a length of a quantity of non-active duct sections selected for use in constructing the air delivery duct system; and
displaying a length difference between a user-input duct length and the sum of the length.

6. A method as defined in claim 1, wherein the operating mode identifier is indicative of one of a low airflow rate output mode, a medium airflow rate output mode, or a high airflow rate output mode.

7. A machine readable storage medium comprising instructions that, when executed, cause a machine to at least:
determine a first quantity of adjustable air outlet duct sections to configure an air delivery duct system when an operating mode identifier is received, the operating mode identifier associated with an amount of air delivered by the air delivery duct system into targeted areas, the first quantity of adjustable air outlet duct sections being based on an airflow rate value and the operating mode identifier, the airflow rate value being indicative of airflow through an air delivery duct system, and each adjustable air outlet duct section including at least one adjustable air outlet having at least one size-adjustable orifice.

8. A machine readable medium as defined in claim 7 having instructions stored thereon that, when executed, cause the machine to determine a custom quantity of adjustable air outlet duct sections to configure the air delivery duct system when the operating mode identifier is not received.

9. A machine readable medium as defined in claim 8 having instructions stored thereon that, when executed, cause the machine to determine an airflow output value for the at least one size-adjustable orifice based on the custom quantity of adjustable air outlet duct sections and a duct diameter when the operating mode identifier is not received or based on the operating mode identifier and the duct diameter when the operating mode identifier is received.

10. A machine readable medium as defined in claim 9 having instructions stored thereon that, when executed, cause the machine to select the duct diameter based on the airflow rate value.

11. A machine readable medium as defined in claim 8 having instructions stored thereon that, when executed, cause the machine to:
determine a sum of the length of the custom quantity or the first quantity of adjustable air outlet duct sections and a length of a quantity of non-active duct sections selected for use in constructing the air delivery duct system; and
display a length difference between a user-input duct length and the sum of the length.

12. A machine readable medium as defined in claim 7, wherein the operating mode identifier is indicative of one of a low airflow rate output mode, a medium airflow rate output mode, or a high airflow rate output mode.

13. A machine readable medium as defined in claim 7 having instructions stored thereon that, when executed, cause the machine to display a quantity of mounting kits for use in installing the adjustable air outlet duct sections.

14. A machine readable medium as defined in claim 7 having instructions stored thereon that, when executed, cause the machine to generate a visual depiction of the air delivery duct system.

\* \* \* \* \*